(12) United States Patent
Celik et al.

(10) Patent No.: US 8,595,633 B2
(45) Date of Patent: Nov. 26, 2013

(54) METHOD AND SYSTEM FOR DISPLAYING CONTEXTUAL ROTATING ADVERTISEMENTS

(75) Inventors: Aytek Esen Celik, Mountain View, CA (US); Xiaobing Han, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 993 days.

(21) Appl. No.: 11/264,366

(22) Filed: Oct. 31, 2005

(65) Prior Publication Data

US 2007/0100867 A1 May 3, 2007

(51) Int. Cl.
*G06F 3/00* (2006.01)
*H04N 7/10* (2006.01)
*G06F 11/00* (2006.01)

(52) U.S. Cl.
USPC ........... 715/760; 715/205; 715/808; 715/823; 725/35; 705/12

(58) Field of Classification Search
USPC ....................................................... 715/825
See application file for complete search history.

(56) References Cited

U.S. PATENT DOCUMENTS

| | | | |
|---|---|---|---|
| 5,937,392 A * | 8/1999 | Alberts | 705/14.52 |
| 5,987,457 A | 11/1999 | Ballard | |
| 6,311,194 B1 * | 10/2001 | Sheth et al. | 715/236 |
| 6,393,415 B1 | 5/2002 | Getchius et al. | |
| 6,452,498 B2 | 9/2002 | Stewart | |
| 6,650,998 B1 | 11/2003 | Rutledge et al. | |
| 6,654,725 B1 * | 11/2003 | Langheinrich et al. | 705/14 |
| 6,691,114 B1 | 2/2004 | Nakamura | |
| 6,879,980 B1 * | 4/2005 | Kothuri et al. | 707/765 |
| 7,287,214 B1 * | 10/2007 | Jenkins et al. | 715/205 |
| 7,685,019 B2 * | 3/2010 | Collins | 705/14.42 |
| 7,725,502 B1 * | 5/2010 | Badros et al. | 705/14.73 |
| 7,844,500 B2 * | 11/2010 | Ran | 705/26.8 |
| 7,937,724 B2 * | 5/2011 | Clark et al. | 725/35 |
| 8,195,508 B1 * | 6/2012 | Calder et al. | 705/14.1 |
| 2002/0052674 A1 | 5/2002 | Chang | |
| 2002/0087402 A1 * | 7/2002 | Zustak et al. | 705/14 |
| 2002/0099606 A1 * | 7/2002 | Shlagman | 705/14 |
| 2002/0147631 A1 | 10/2002 | Smith et al. | |
| 2002/0156917 A1 * | 10/2002 | Nye | 709/238 |
| 2003/0008661 A1 * | 1/2003 | Joyce et al. | 455/456 |
| 2003/0046162 A1 * | 3/2003 | Nestel | 705/14 |
| 2003/0061211 A1 | 3/2003 | Shultz et al. | |
| 2003/0064705 A1 | 4/2003 | Desiderio | |
| 2003/0120650 A1 * | 6/2003 | Wills | 707/5 |
| 2003/0154142 A1 | 8/2003 | Ginsburg et al. | |

(Continued)

OTHER PUBLICATIONS

Internet Archive Wayback Machine of Darden Restaurants (www.darden.com), Oct. 13, 2004, http://web.archive.org/web/20041013080914/http://www.darden.com/.*

(Continued)

*Primary Examiner* — Matt Kim
*Assistant Examiner* — Yongjia Pan
(74) *Attorney, Agent, or Firm* — Brinks Gilson & Lione

(57) ABSTRACT

A method is disclosed for providing advertising content for display in a page over a network. A plurality of advertisements are determined that are qualified for display at a location in the page. When an advertiser has stores located at a plurality of geographic sites, only one advertisement for a store located at a first geographic site may be displayed. Thereafter, the advertisement for a store located at a second geographic site different from the first geographic site may be displayed.

17 Claims, 15 Drawing Sheets

(56) References Cited

U.S. PATENT DOCUMENTS

| | | |
|---|---|---|
| 2003/0158796 A1 | 8/2003 | Balent |
| 2004/0044571 A1* | 3/2004 | Bronnimann et al. .......... 705/14 |
| 2004/0104930 A1 | 6/2004 | Stoler |
| 2004/0138956 A1 | 7/2004 | Main et al. |
| 2004/0249801 A1 | 12/2004 | Kapur |
| 2005/0027705 A1 | 2/2005 | Sadri et al. |
| 2005/0034075 A1 | 2/2005 | Riegelman et al. |
| 2005/0050027 A1* | 3/2005 | Yeh et al. ........................... 707/3 |
| 2005/0125237 A1 | 6/2005 | Harrison |
| 2005/0125284 A1 | 6/2005 | Fairbaugh |
| 2005/0149507 A1 | 7/2005 | Nye |
| 2005/0160014 A1 | 7/2005 | Moss et al. |
| 2005/0165744 A1 | 7/2005 | Taylor et al. |
| 2005/0187823 A1 | 8/2005 | Howes |
| 2005/0203768 A1 | 9/2005 | Florance et al. |
| 2005/0216334 A1* | 9/2005 | Mehrabani-Farsi ............. 705/14 |
| 2005/0216547 A1* | 9/2005 | Foltz-Smith et al. ......... 709/200 |
| 2005/0222908 A1* | 10/2005 | Altberg et al. ................... 705/14 |
| 2005/0256766 A1* | 11/2005 | Garcia et al. .................... 705/14 |
| 2005/0273376 A1 | 12/2005 | Ouimet et al. |
| 2006/0015449 A1 | 1/2006 | Underwood et al. |
| 2006/0026067 A1* | 2/2006 | Nicholas et al. ................ 705/14 |
| 2006/0085283 A1* | 4/2006 | Griffiths ........................... 705/26 |
| 2006/0100923 A1 | 5/2006 | Courchesne |
| 2006/0287918 A1 | 12/2006 | Canaday |
| 2007/0027753 A1* | 2/2007 | Collins ............................ 705/14 |
| 2007/0061074 A1 | 3/2007 | Safoutin |
| 2007/0210155 A1 | 9/2007 | Swartz et al. |
| 2011/0138415 A1* | 6/2011 | Weisman et al. ............... 725/35 |

OTHER PUBLICATIONS

AdCycle Ad Management Software, Dec. 8, 2002, http://web.archive.org/web/20021208030123/http://www.adcycle.com/getting_started.html.*

BanManPro's Ad Serving Software, Jul. 22, 2005, http://web.archive.org/web/20050721032727/www.banmanpro.com/features.asp.*

Perry Marshall, Playing to Win in Google AdWords: How to Structure Your Campaigns for Maximum Results from the Very Beginning, 2004, http://craigarmstrongphotography.com/brian/pdf/Adwords_fast_start.pdf.*

Split Testing Ad Copy & Landing pages, Feb. 2, 2005, http://www.webmasterworld.com/forum81/4502.htm.*

Adgroups—how do multiple text ads work?, Nov. 5, 2004, http://forums.searchenginewatch.com/archive/index.php/t-2579.html.*

Split Test, Sep. 21, 2004, 3 pages.*

Split testing Adwords, Sep. 23, 2004, 5 pages.*

Bob Tedeschi, "Is That Item Sold Out? Know Before You Go" Dec. 12, 2005, New York Times.

Saul Hansell, "Google Wants to Dominate Madison Avenue, Too" Oct. 30, 2005, New York Times.

Bob Tedeschi, "Newspaper Ad Circulars Find Their Way Online" Oct. 31, 2005, New York Times.

"Yahoo upgrades mapping service" CNN.com, printed Nov. 3, 2005.

PCT Search Report for Application No. PCT/US06/48569 dated Feb. 25, 2008.

* cited by examiner

400

YAHOO! LOCAL    WELCOME, AYTEKEC    YAHOO! LOCAL LISTINGS HOME - YAHOO! LOCAL - HELP
                [SIGN OUT]
                YAHOO! LOCAL LISTINGS

402 — STEP 1: CREATE/ EDIT LISTING

1. LISTING DETAILS  2. SELECT CATEGORY  3. ADD IMAGES  4. PREVIEW  5. SELECT REGIONS  6. PAYMENT

FIELDS MARKED WITH AN ASTERIK * ARE REQUIRED

404 — CONTACT INFORMATION    WHAT'S THIS?
CONTACT INFORMATION IS NEEDED FOR ACCOUNT MANAGEMENT PURPOSES ONLY AND WILL NOT APPEAR IN YOUR LISTING. FOR MORE INFORMATION, PLEASE REVIEW OUR PRIVACY POLICY

| FIRST NAME* | [    ] | EMAIL* | [    ] |
| LAST NAME*  | [    ] | PHONE* | [    ] |

406 — LOCATION INFORMATION    WHAT'S THIS?

| BUSINESS NAME* | [    ]                    | WEB ADDRESS       | HTTP://              |
| LOCAL PHONE*   | [    ] (EX. 408-555-9876) | FREE WEBSITE† INFO ON BUILDING YOUR SITE |
| ADDRESS*       | [    ]                    | TOLL-FREE PHONE   | [    ] (EX. 1-800-555-1234) |
| CITY*          | [    ]                    | FAX               | [    ] (EX. 408-555-1212)   |
| STATE*         | SELECT ONE                | COMPANY EMAIL     | [    ]               |
| ZIP*           | [    ]                    | ADDITIONAL PHONE NUMBERS | [    ]        |

☐ DO NOT DISPLAY MY BUSINESS ADDRESS    WHAT'S THIS?

408 — HOURS OF OPERATION    WHAT'S THIS?    410 — PAYMENT METHODS ACCEPTED    WHAT'S THIS?

○ DO NOT DISPLAY OPERATING HOURS
○ 24 HOURS A DAY
○ USE HOURS OF OPERATION BELOW:

| MONDAY    | 9:00A.M | TO | 5:00P.M |
| TUESDAY   | 9:00A.M | TO | 5:00P.M |
| WEDNESDAY | 9:00A.M | TO | 5:00P.M |
| THURSDAY  | 9:00A.M | TO | 5:00P.M |
| FRIDAY    | 9:00A.M | TO | 5:00P.M |
| SATURDAY  | CLOSED  | TO | CLOSED  |
| SUNDAY    | CLOSED  | TO | CLOSED  |

☐ CASH ONLY
☐ VISA
☐ MASTERCARD
☐ AMERICAN EXPRESS
☐ DISCOVER
☐ DINERS CLUB
☐ DEBIT CARD
☐ PERSONAL CHECKS

412 — ADDITIONAL HOURS OF OPERATION INFORMATION
E.G. ALSO AVAILABLE BY APPOINTMENT

[                    ]

ADDITIONAL INFORMATION    WHAT'S THIS?

| YEAR ESTABLISHED | [    ] | PRODUCTS & SERVICES OFFERED | [    ] |
| LANGUAGES SPOKEN | [    ] | PROFESSIONAL ASSOCIATIONS   | [    ] |
| BRAND NAMES CARRIED | [    ] |                          |         |

( CONTINUE )    ( CANCEL )

† FROM WEB SITE FEATURE IS CURRENTLY IN BETA

COPYRIGHT © 2005 YAHOO! INC. ALL RIGHTS RESERVED
PRIVACY POLICY - COPYRIGHT POLICY - TERMS OF SERVICE

YAHOO! SEARCH MARKETING  WELCOME, PS_BS1  LOCAL LISTINGS- YAHOO!
[SIGN OUT]

LOCAL LISTINGS  ADVERTISER: BS1-BS1
ADVERTISER ID: 50DD55651  SELECT ACCOUNT

HOME | UPLOAD LISTINGS | PRICING & INVENTORY | REPORTS | MY ACCOUNT

PRICING & INVENTORY — 904 — 906
1. CHOOSE YOUR BUSINESS CATEGORY & SUB-CATEGORY

[-SELECT CATEGORY-]  [-SELECT SUB-CATEGORY-]

2. CHOOSE YOUR REGION

[-SELECT AREA-]  [-SELECT STATE-]  [SAN FRANCISCO-OAKLAND-SAN JOSE, CA]  (SHOW AVAILABLE INVENTORY)
908           910            912                                      914

RESULTS FOR GOLF COURSES NEAR SAN FRANCISCO-OAKLAND-SAN JOSE, CA    EDIT CATEGORIES  — 918

916

| REGION | TOP OF PAGE | BOTTOM OF PAGE |
|---|---|---|
| 1. ALAMEDA, CA | $24.00 | $16.00 |
| 2. CLEARLAKE, CA | $16.00 | $12.00 |
| 3. CONTRA COSTA, CA | $24.00 | $16.00 |
| 4. MARIN, CA | $24.00 | $16.00 |
| 5. NAPA, CA | $24.00 | $16.00 |
| 6. SAN FRANCISCO, CA | $24.00 | $16.00 |
| 7. SAN MATEO, CA | $24.00 | $16.00 |
| 8. SANTA CLARA, CA | $24.00 | $16.00 |
| 9. SANTA ROSA-PETALUMA, CA | $24.00 | $16.00 |
| 10. UKIAH, CA | $16.00 | $12.00 |
| 11. VALLEJO-FAIRFIELD, CA | $24.00 | $16.00 |
| TOTAL PRICE | $248.00 | $168.00 |

SANTA CLARA, CA  CLOSE
INVENTORY AVAILABLE
TOP  $24
BOTTOM  $16

— 920

AVAILABLE INVENTORY IS SUBJECT TO CHANGE. PLEASE BOOK YOUR LISTINGS AS EARLY AS POSSIBLE FOR THE BEST CHANCE OF SECURING INVENTORY

METHOD AND SYSTEM FOR DISPLAYING CONTEXTUAL ROTATING ADVERTISEMENTS

TECHNICAL FIELD

The present invention relates generally to providing advertising content over a computer network, and more particularly, but not exclusively, to selecting relevant advertisements for limited advertisement spaces.

BACKGROUND

Online advertising may be an important source of revenue for enterprises engaged in electronic commerce. A number of different kinds of page-based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a page to be configured to contain a location for inclusion of an advertisement. An advertisement can be selected for display each time the page is requested, for example, by a browser or server application.

One common variety of online advertisement is the display of advertisements based on a user's query term and/or query location. For example, a user may conduct an on-line search for a coffee shop in San Francisco. In this way, ads may be displayed for advertisers having relevant businesses located near the user's query location. Often the advertisement space for displaying the ads of the local businesses is limited in space. Only a certain number of relevant business advertisements may be displayed. A problem may occur in that there may be more businesses near the query location than can be displayed in the ad space shown to the user. A problem may arise in determining which business ads to display.

SUMMARY

By way of introduction, the embodiments described below include a method and system for advertising. The embodiments relate to advertisement listings based on categories associated with search results. The embodiments further relate to geographic limitations of those advertisements. In one embodiment, the advertisements displayed may be rotated so that ads from one company are not shown together, but rather ads from multiple companies can be shown.

In a first aspect, a method is disclosed that provides advertising content for display in a page over a computer network includes: establishing a portion of the page to display an advertisement; determining an advertisement that is qualified for display in the portion of the page; determining whether any qualified advertisement is for an advertiser having more than one advertisement; and rotating the advertisements for the advertiser such that only one advertisement per advertiser is displayed at any one time.

In a second aspect, an ad server is disclosed for providing advertising content for display in a page over a computer network to a user includes: a database to store a plurality of advertisements; and a computer executed program, including: a first routine to determine a qualified advertisement from the plurality of advertisements for display in a portion of the page; a second routine to determine whether the qualified advertisement is one of a plurality of qualified advertisements that are for a single advertiser; and a third routine to rotate advertisements for the single advertiser such that only one advertisement from the single advertiser is displayed at any one time.

In a third aspect, a method is disclosed for displaying advertisements on a page, the method including: determining a plurality of advertisements that are qualified for display on the page; determining whether more than one of the advertisements are for a single advertiser; and rotating the advertisements for the single advertiser such that only one advertisement for the single advertiser is displayed to the user at any one time.

In a fourth aspect, a method is disclosed for providing advertising content for display in a page over a network to a user, the method including: providing an input selector for an advertiser to input a search category, wherein the search category corresponds to a query term of the user; providing an input selector for an advertiser to input a region, wherein the region corresponds to a location of the user; and displaying the advertising content of the advertiser if the user searches for the query term corresponding to the inputted search category and the location corresponds to the inputted region.

In a fifth aspect, a method is disclosed for matching a search query to an advertisement, the method including: receiving a search term for the search query; determining search results for the search term; correlating each of the search results to at least one search category; determining an amount of the search results that correlate to the search category; selecting one of the search categories in accordance with the determined amount; and providing advertiser content in accordance with the selected search category.

In a sixth aspect, a system is disclosed for matching a search query to an advertisement, including: a user interface to receive a search term; a search algorithm engine connected with the user interface, the search algorithm engine to determine search results for the search term; and a category engine connected with the search algorithm engine, the category engine to correlate each of the search results to at least one search category, determine an amount of the search results that correlate to the search category, select one of the search categories in accordance with the determined amount, and provide advertiser content in accordance with the selected search category.

In a seventh aspect, a method is disclosed for matching a query term and location of a user to an ad of an advertiser, the method including: performing a search algorithm on the query term and location received from the user to obtain search results; determining if the query term correlates to a determined advertiser category; requesting advertiser content for the advertiser category if the query term correlates to the determined advertiser category and if the location correlates to a determined advertiser location; determining each search category associated with the search results if the query term did not correlate to the determined advertiser category; determining a count for each search category of the associations with the search results; and requesting advertiser content for the search category based on the count.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the preferred embodiments.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

FIG. 4 is an illustration of an exemplary advertiser interface.

FIG. 5 is an illustration of an exemplary advertiser interface.

FIG. 7 is an illustration of an exemplary advertiser interface.

FIG. 9 is an illustration of an exemplary advertiser interface.

FIG. 13A and FIG. 13B are illustrations of exemplary search results pages.

DETAILED DESCRIPTION

The principles described herein may be embodied in many different forms. The methods and systems may allow businesses to have ads displayed on a web page in accordance with a context of the page. The methods and systems may allow advertising on search results pages by enabling advertisers to select an advertising category and advertising region for the ad to be displayed. An algorithm may be used to determine a category of the search results resulting from a consumer query term and query location. The methods and systems may allow geographically dense chain businesses to advertise in limited ad spaces by rotating the relevant ad listings. The method and system may also serve the ad listing for the closest location, based on the user query, user query location and/or the advertiser location.

Figure 1:
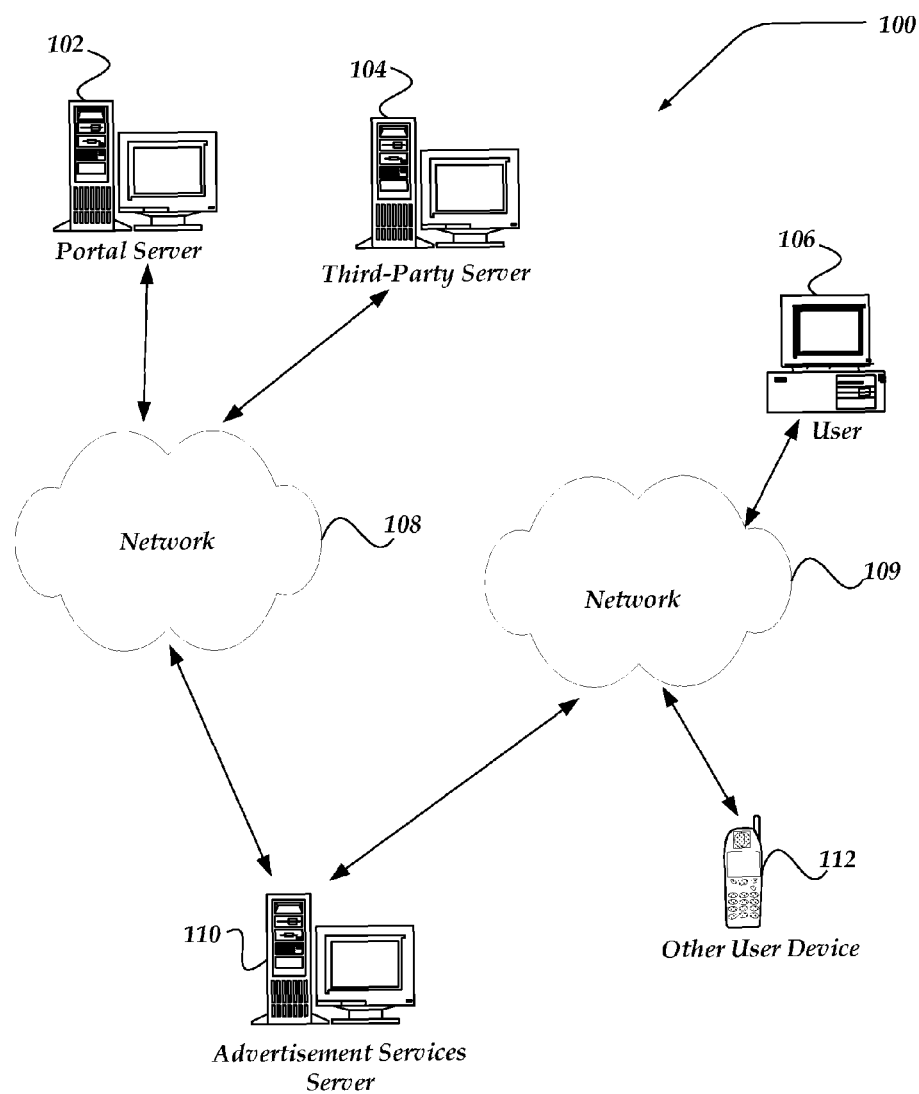
FIG. 1 provides a simplified view of one embodiment of an operating environment.

FIG. 1 provides a simplified view of a network environment. Not all of the depicted components may be required, however, and some embodiments of the invention may include additional components not shown in the figure. Variations in the arrangement and type of the components may be made without departing from the spirit or scope of the claims as set forth herein.

Figure 3:
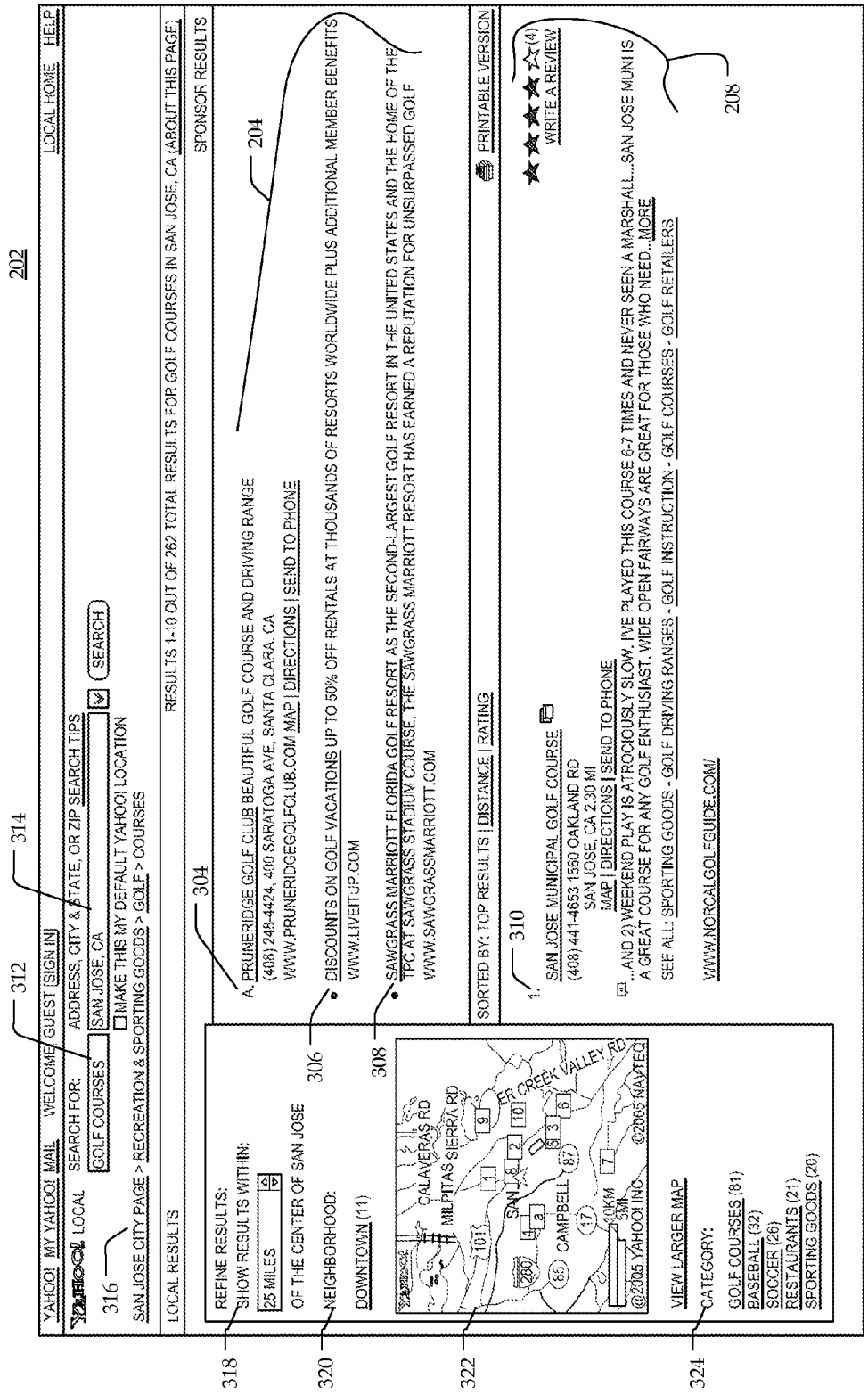
FIG. 3 is an illustration of an exemplary search results page.

In FIG. 1, environment 100 includes an advertisement services server 110, which may provide a platform for selection, optimization, and/or distribution of advertisements for inclusion in pages, such as web pages (e.g. FIG. 3). Pages may be provided to users by a portal server 102 and/or a third-party server 104. In FIG. 1, users are represented by a user device 106, depicted as a conventional personal computer, and/or other device such as a mobile user device 112, including a network-enabled mobile phone, personal digital assistant (PDA), pager, network-enabled television, digital video recorder, such as TIVO, and/or automobile.

Some or all of advertisement services server 110, portal server 102, and third-party server 104 may be in communication with each other by way of network 108. The advertisement services server 110 and portal server 102 may each represent multiple linked computing devices, and multiple third-party servers, such as third-party server 104, may be included in environment 100. Network 108 may be regarded as a public or private network connection and may include, for example, a virtual private network or an encryption or other security mechanism employed over the public Internet, or the like.

User device 106 and mobile user device 112 are represented by user-interactive devices that typically run browser applications, and the like, to display requested pages received over a network. The user may be a consumer of goods of services that is searching for a business such as a business of the advertiser. Such devices are in communication with portal server 102 and/or third-party server 104 by way of network 109. Network 109 may include the Internet and may include all or part of network 108; network 108 may include all or part of network 109.

Portal server 102, third-party server 104, advertisement services server 110, user device 106, and mobile user device 112 represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, user device 106 may be configured to execute a browser application that employs HTTP to request information, such as a web page, from a web server, which may be a process executing on portal server 102 or third-party server 104.

Networks 108, 109 may be configured to couple one computing device to another computing device to enable communication of data between the devices. Networks 108, 109 may generally be enabled to employ any form of machine-readable media for communicating information from one device to another. Each of networks 108, 109 may include one or more of a wireless network, a wired network, a local area network (LAN), a wide area network (WAN), a direct connection such as through a Universal Serial Bus (USB) port, and the like, and may include the set of interconnected networks that make up the Internet. Networks 108, 109 may include any communication method by which information may travel between computing devices.

Figure 2:
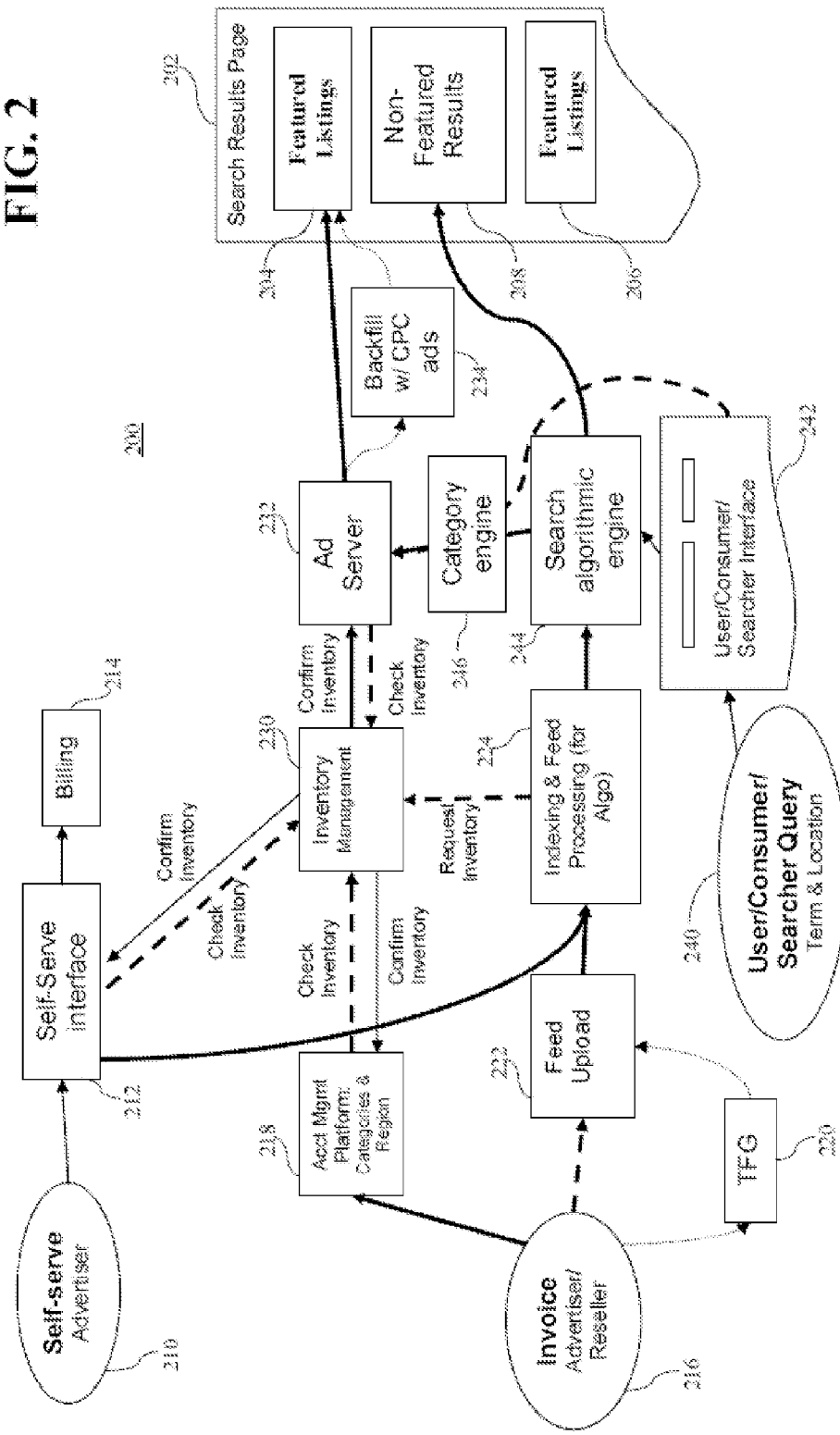
FIG. 2 is a block diagram of an exemplary system for advertising.

FIG. 2 is a block diagram of an exemplary system 200 for displaying advertisements. The system 200 shows components and steps that an advertiser may take in advertising. The system 200 also shows components and steps a service provider may take to display the advertisements. Results of a search may be displayed in a web page 202. The system allows an advertiser to purchase an ad. The advertiser may also be referred to as a company, business, chain, or store.

The web page 202 may display featured listings 204, 206 and/or non-featured results 208 at various locations on the web page 202. The featured listings 204, 206 are listings that an advertiser pays to have placed in the featured listing part of the web page 202. The featured listings 204, 206 may be set apart from the rest of the web page 202 by displaying behind the content a color or shading different than the rest of the web page 202 or by displaying the content of the featured listings 204, 206 in a visually different manner than the content on the rest of the web page 202 such as by changing the color of the background or the font. Featured listings may be displayed at a predetermined part of the page such as at the top 204 of the web page 202 and/or at the bottom 206 of the web page. The featured listings 204, 206 may be advertisements that display an advertiser's information, described in more detail below. The web page 202 may also display non-featured results 208, such as those determined by a search algorithm of search algorithmic engine 244 without an advertiser paying to have their advertisement positioned in a featured part of the web page 202. The featured listings 204, 206 may be related, however, to the non-featured results 208, as described in more detail below.

FIG. 3 is an example of a web page 202. The web page 202 shows both featured listings 204 and non-featured results 208. Both the featured listings 204, 206 and the non-featured results 208 may display information such as a name, address, and/or a phone number. In addition, the advertiser's name may be hyperlinked to a page displaying other details about the advertiser, or the advertiser's web site. A link to a map 322 and/or directions to the address of the advertiser may also be displayed. One or more categories 324 may be associated with the particular result listing. The search results may also be listed as non-enhanced or enhanced listings. Enhanced listings display more information than just basic information related to a search result. An enhanced listing can display all the information from the basic result such as name, address, phone number and link, and also give space for additional information such as a picture or logo, a slogan or description, additional links, and other additional information. Either the basic search results or the enhanced listings may display more or less information.

In one example, there are three available slots for featured listings to be displayed at the top 204 of the page. One listing 304 is purchased by an advertiser as a featured listing. The remaining two listings 306, 308 are back-fill advertisements. In one embodiment, the featured listing 304 is paid for based on placement in the featured listings section of the page 202. The back-fill advertisement listings 306, 308 may be paid for in other ways, such as based on the number of users who click a link of the advertisement. Additional featured listings may also be displayed at the bottom of the page under the non-featured results 208. In alternative embodiments, the number of slots available for featured listings may vary to include room for more or less than three listings. For example, for a Personal Digital Assistant ("PDA") or a cell phone browser, there may be only one slot available for a featured listing.

The purchased featured listings such as listing 204 may be determined by an algorithm. The algorithm may consider a determined category of the user's search term, as described in more detail below. In one embodiment, the featured listings are displayed if they match or correlate to the geographic location and the category of the user's search. A category is a grouping of one or more related search terms or keywords. One example would be an advertiser who purchased the category "florist." The "florist" category may include the keywords roses, daisies, lilies or other types of flowers. The advertiser may purchase a featured listing based on the category. The advertiser does not have to think of keywords that a consumer will search for, but rather just the category. The purchase of a category may make advertising easier and more effective.

The featured listings may include, but are not limited to, a business name, tagline, display URL with potentially different click-thru URL, telephone number, street address (may be suppressed), city, state, map link, directions link, Send-to-Phone link, or logo. The listing elements may include a click thru to either a hosted business details page or an advertiser's web page. The map, directions and Send-to-Phone links may click thru to a maps page, directions page, send-to-phone page, or a pop-up page, respectively. In an alternative embodiment, the featured listings may apply to industry specific local listings, or local event listings. Examples of industry specific local listings may be job listings, real estate listings, auto-related listings, personals listings, or any other industry specific listings. Local event listings add the dimension of date and time to the typical business or service listing.

A non-featured result 310 can be one of many search results (the rest of which are not shown). In one embodiment, there can be a total of ten search results per page with multiple pages. A non-featured result 310, or other non-purchased listing may be shown as a basic listing with listing information such as address and phone number. Alternatively, a link to a web page and possibly, a two line quote may be included with a basic listing. A non-featured result 310, or other purchased listing may also be shown as an enhanced listing which may include a link to a web page, and potentially a tagline and additional promotional links or information. The non-featured result 310 need not be enhanced. Enhancement of a basic listing is similar to an advertisement in that the advertiser pays to have its listing enhanced, however, the listing may still appear as a non-featured result of the search. The non-featured results, whether basic or enhanced may include a different variety of information.

The search shown in FIG. 3 may be initiated by the user 106, 112 entering search terms into a search box 312 and a location box 314 located on the page 202. Alternatively, the user may initiate a search by clicking on a hyperlinked text line of any search term. This link initiates a search, just as if the user had typed the search term into a search box. For example, the hyperlinked term "golf courses" may appear as part of a list of popular searches for that week for a given location and the user can click on a link for "golf courses" and see the search results as if the user typed "golf courses" into the search box. For explanatory purposes, the user is searching for "golf courses", listed in search box 312, and "San Jose, Calif." listed in location box 314. The result 310 shown is the first or closest match or correlation to golf courses in San Jose, Calif. The closest match may be determined many different ways. In terms of geography, closest may mean shortest physical distance, or may mean shortest driving distance taking into account traffic, speed limits, etc. In terms of categories, closest may be determined based on the search engine logic or algorithm taking in to account additional factors. The category relating to the search is shown in the category hierarchy 316 to be "Courses" within "Golf." The category hierarchy 316 expands further to "Recreation & Sporting Goods" within "San Jose City Page." A related category section 324 is also shown. The related category section 324 contains categories that may relate to the search. The number next to the listed category may correspond to the number of search results listed within the category, such as eighty one results for "Golf Courses".

The web page 202 in FIG. 3 may display results based on geographic information. The geographic location may be received explicitly from the location box 314. Alternatively, the location can be determined implicitly based on the detection of a location from cookie information, registration information, IP address, global positioning satellite (GPS) device, television, or other methods. In an alternative embodiment, the device used to do the search may be something other than a computer, such as a mobile phone, PDA, pagers, automobile software, televisions, digital video recorders (e.g. DVRs like TIVO), etc. The devices may include GPS. For these variations, the location input may be based on implicit location rather than explicit location. The search results displayed may be displayed such that the advertiser of the search result is located near or within the given geographic location of the user.

The web page 202 may display options to the user 106, 112 that are related to the geographic information. The map 322 may show the location of each of the algorithmic search results. The box with a "1" in the map 322 may correspond to the first search result 310. The map 322 may also display the location of the featured listings. The featured listing 304 may be labeled with an "a" and there may be a corresponding box with an "a" on the map 322 to show the location of the business advertised in the featured listing 304. The map 322 may be expandable for easier viewing and may allow for both zooming in and zooming out for the user 106, 112 to view different features. The neighborhood 320 lists an area shown in the map 322. The neighborhood link allows a user to refine the search by limiting the search results to a particular neighborhood. For example, if the map had been of Manhattan, the user may see neighborhoods labeled for SoHo, East Village, etc. The result radius 318 may be modified to find results over a greater area, or to narrow the search results over a smaller area. The results displayed are those results that are within the selected result radius 318. A default value for the result radius 318 can be modified by the user.

In FIG. 2, an advertiser may purchase enhanced listings or featured listings to be advertised on a web page 202. A consumer search is also described, followed by the process by which both the non-featured results 208 and the featured listings 204, 206 may be displayed.

The advertiser may be a self-serve advertiser 210 or an invoice advertiser/reseller 216. An invoice advertiser/reseller 216 may include an advertiser who buys large quantities of advertisements. An advertiser may also be referred to as a business, company, organization, holding company or store. In general, an advertiser is someone or something that purchases an advertisement. The self-serve advertiser 210 may include a smaller advertiser who does not buy large quantities of ads. Typically, the self-serve advertiser 210 may be a small business with limited locations, whereas an invoice advertiser/reseller 216 may be a national corporation.

The self-serve advertiser 210 may purchase advertising space via the self-serve interface 212. The self-serve interface 212 helps the advertiser to determine available advertisement inventory. FIGS. 4-9 are illustrations of steps that may be part of the self-serve interface 212. In an alternate embodiment, FIGS. 4-9 may also represent the interface for an invoice advertiser 216 to purchase an advertisement. Specifically, FIGS. 4-9 are illustrations of various interfaces through which an advertiser may purchase an ad by entering relevant information about the business to be advertised and the category and region which the add is based on.

FIG. 4 illustrates an interface 400 in which an advertiser may enter their business listing to be advertised. The interface 400 is the listing details 402 of the advertiser or business placing the ad. The advertiser must enter contact information 404, which may include name, email, or phone. The advertiser can then enter the location information 406. The location information 406 is the business name and location as well as any other relevant information on the business to be advertised. Other information may include a web site, email or fax number. The advertiser can also enter the hours of operation 408 to display when the business being advertised is open or the payment methods 410 that the business accepts. Finally, the advertiser may enter any additional information 412 such as year established, languages, brand names carried, products and services offered or professional associations. All the listed information is merely exemplary and the advertiser may be able to enter more or less information relating to the business to be advertised.

Figure 5:
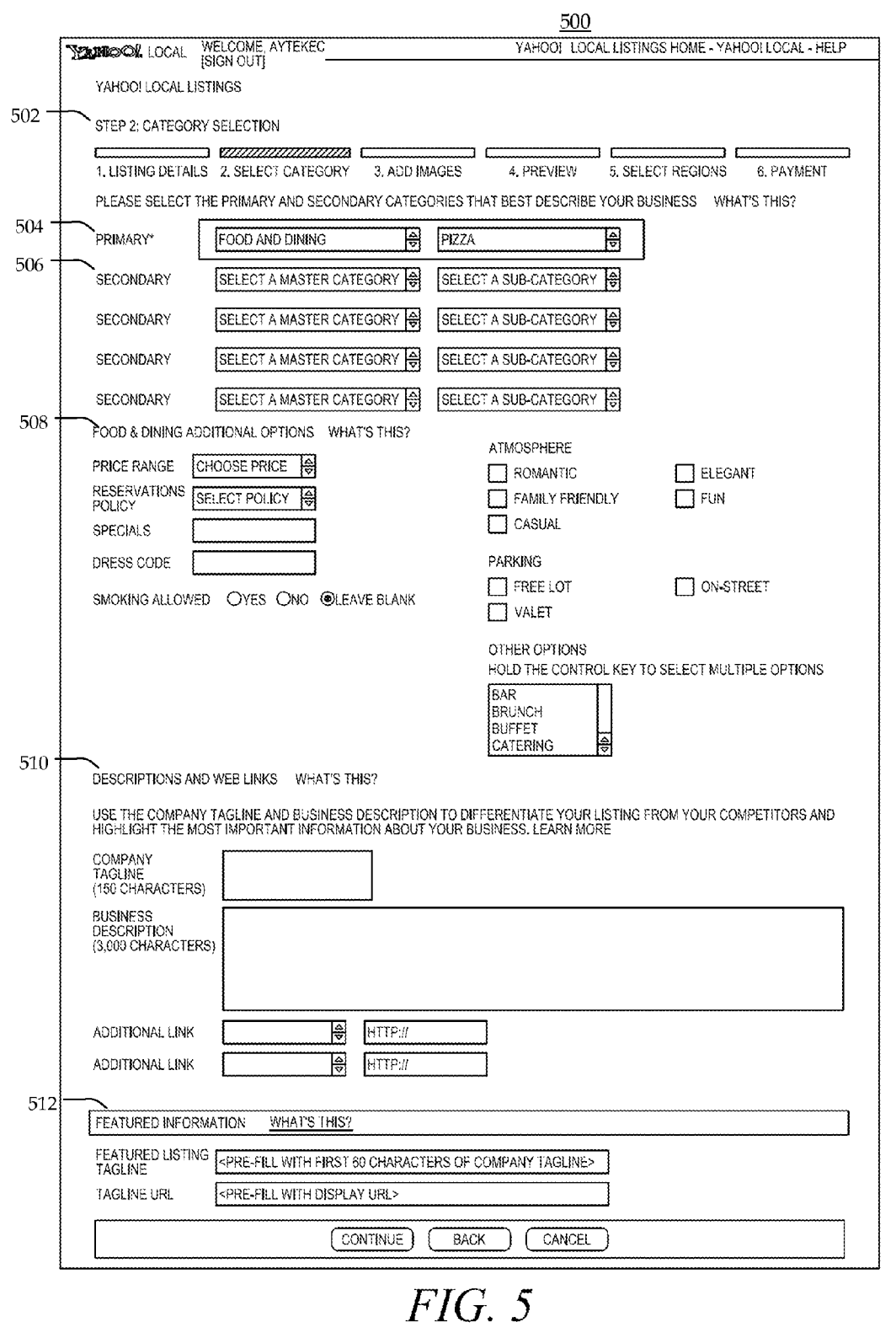

FIG. 5 illustrates an interface 500 in which an advertiser may enter a category for their advertisement. The interface 500 is for the category selection 502 of the advertisement. The advertiser may choose a primary category 504. The primary category 504 may relate to a general area for the advertiser's business. The advertiser may then choose the category 506 for the advertisement. The category 506 may comprise a master category and a sub-category. The sub-category may be a subset of the master category. The category 506 is used to determine when an advertisement is displayed. If a user searches for keywords that are in that category, then the advertisement is displayed. Interface 500 may give additional options 508 based on the category 506 chosen. In this example, the primary category is "Food and Dining" with a primary sub-category of "Pizza." This is just one example of a primary category and primary sub-category. "Food and Dining" may have sub-categories for many different types of food. Additional options 508 in this example may be price range, reservations policy, dress code, smoking allowed, atmosphere, parking or other options. The additional options 508 may be unique for different categories or sub-categories. The advertiser can also include further descriptions and web links 510 such as a web link, a company tagline or description, or a further business description. The ad may also include featured information 512 which may include a longer or shorter tagline or description or a tracking/web address.

Figure 6:
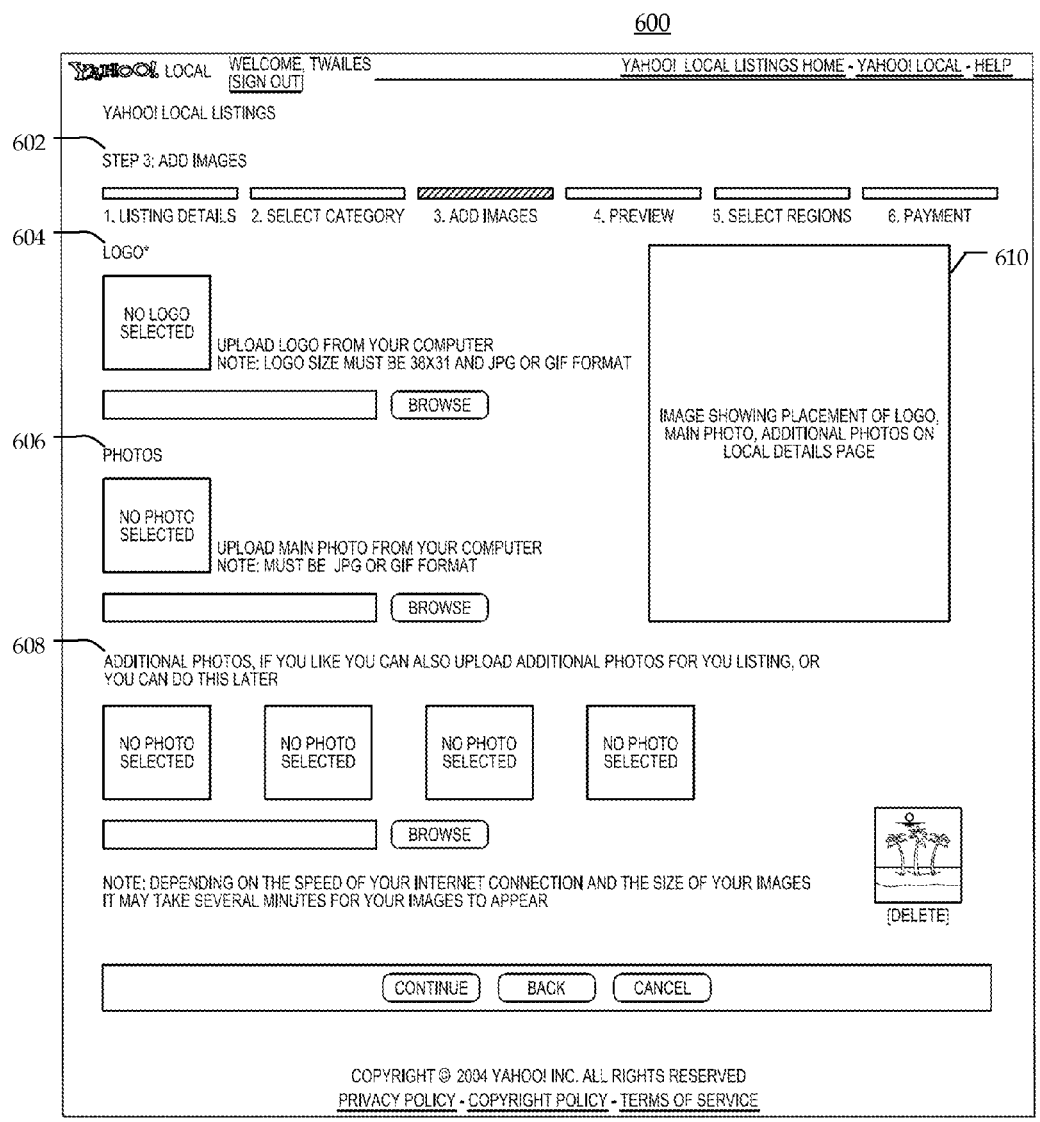
FIG. 6 is an illustration of an exemplary advertiser interface.

FIG. 6 illustrates an interface 600 in which an advertiser may include images with their advertisement. The interface 600 is for adding images 602 to the advertisement. A logo 604, a photo 606, or additional photos 608 for the business may be added to the advertisement. The logo 604 may be a trademark or other identifier of the business being advertised. The photos 606, 608 may be of the business or relevant products or other advertising materials. The image 610 shows the logo 604 or photos 606, 608 that may be displayed.

Figure 7:
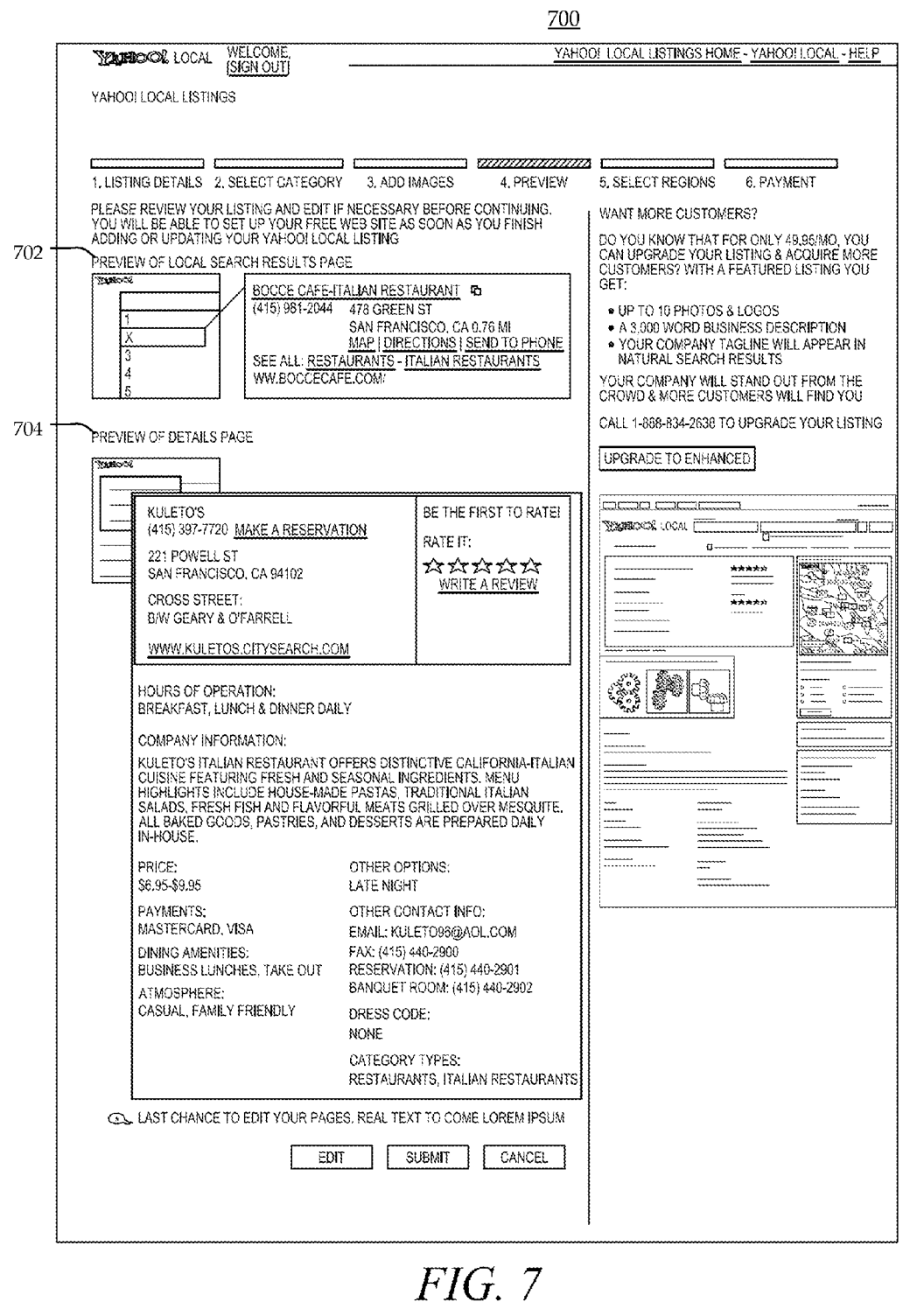

FIG. 7 illustrates an interface 700 in which an advertiser may preview their advertisement. The advertiser can view a preview of the search results page 702 or view a preview of a details page 704. The details page 704 may be a separate window that is shown when a user clicks on or scrolls on an advertisement.

Figure 8:
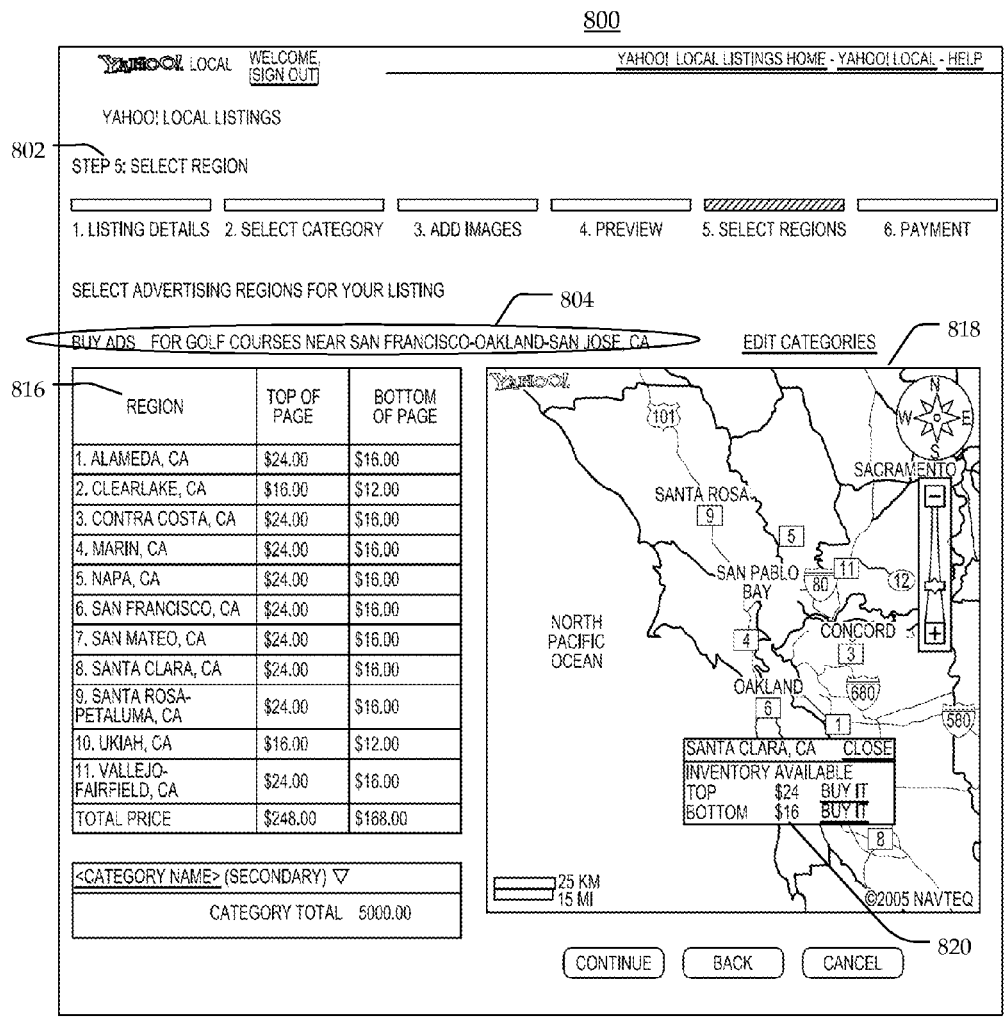
FIG. 8 is an illustration of an exemplary advertiser interface.

FIG. 8 illustrates an interface 800 in which an advertiser may choose a region or location for an advertisement. The interface 800 is for selecting a region 802 for the advertisement. The advertiser has already selected a category 804. In FIG. 8, the category is shown to be golf courses. The interface 800 automatically selects a region based upon the address of the business from the location information 406 as shown in FIG. 4. The category 804 shows the geographic location as "near San Francisco-Oakland-San Jose, Calif" The advertiser may choose the region for an advertisement to display. The advertiser may select a location various ways, such as by pointing a curser to a location on a map 818 displayed. Different geographic locations and the determination of regions and the size of regions will be discussed below in association with FIGS. 11 and 13.

The map 818 shows a geographic area. In this case, the area shown is "San Francisco-Oakland-San Jose, Calif." The map 818 may display available inventory, which is also shown in the results spreadsheet 816. The locations on the map 818 correspond with the regions shown in the results spreadsheet 816. The map 818 may display available, unavailable and an advertiser's already booked inventory for particular regions. An advertiser may click on the map 818 to select and purchase featured advertisements for a particular region for a given category 804. The map 818 can be resized and the advertiser can zoom in and zoom out when selecting a region. As shown in map 818, the advertiser has selected the "Santa Clara, Calif." region associated with number 8 in the results spreadsheet 816. The details 820 of that particular region are shown including the inventory available, the price, and the location of the featured listings available.

In FIG. 2, the self-serve interface 212 allows an advertiser to tender payment to purchase an enhanced listing, a featured listing, or both through billing 214. In one embodiment, the billing 214 is made through a credit card. Alternative forms of payment are possible. During a purchase, the self-serve interface 212 may check with inventory management 230 to determine if the ad the user wishes to purchase is available. For example, the user determines if there are available featured listings for "golf courses" in "San Jose, Calif." There may be a finite number of featured listings that can be shown on a search results page or web page and therefore a limited number featured listings may be sold. Inventory management 230 may determine if the category and geographic location of a requested featured listing is available.

The inventory management 230 may confirm the inventory with the account management platform 218. The inventory management 230 may also communicate with the ad server 232 when the ad is displayed as will be discussed below as related to FIG. 10. If one or both of the category or location is not available, inventory management 230 may prompt the advertiser for other available inventory for other categories, or for alternate geographical locations. The alternate geographical locations may be a separate location or may be a larger region. An advertiser who could not get the category/location requested may receive notification if the category/location requested becomes available at a later date.

Unlike a self-serve advertiser 210, an invoice advertiser/reseller 216 may be an advertiser that buys large quantities of advertisements. The method in which they purchase ads may be different from the self-serve advertiser. The invoice advertiser/reseller 216 may use the account management platform 218 to check or confirm inventory with inventory management 230.

FIG. 9 is an illustration of an exemplary advertiser interface. FIG. 9 may illustrate an account management platform 218. The account management platform 218 is usually directly associated with invoice advertiser/resellers 216 rather than self-serve advertisers 210. The invoice advertiser 216 may purchase advertising space via the account management platform 218. The account management platform 218 helps the advertiser to determine available advertisement inventory or check existing inventory. The user may enter a category 904 and/or a sub-category 906. An example of either a category 904 or a sub-category 906 is "golf courses." If "golf courses" is the category 904, then possible sub-categories 906 may be types of courses, difficulty of courses or the cost of the courses. If the sub-category 906 is "golf courses," then the category 904 may have been recreation, sports facilities, or sporting venues. This is just one example of the categories from which an advertiser purchases an ad.

In addition to selecting a category for an advertisement, the advertiser may select a geographic location or region for which the advertiser determines to advertise. The area 908, the state 910, or the region 912 can be selected from the pull-down menus to narrow the geographic location for which the ad will be displayed. The advertiser may select a location from any or all of the area 908, the state 910, or the region 912 and selects the show available inventory button 914. This is just one embodiment of the selection of geographic location. Alternatively, the advertiser may be provided a limited set of advertising region choices from which to choose based on the advertiser's business address. The advertiser may also select a location in other ways such as by pointing a curser to a location on a map displayed on the page 212 and clicking. Different geographic locations and the determination of regions and the size of regions will be discussed below in association with FIGS. 11 and 13.

The map 918 shows the selected region 912. In this case, the region 912 is "San Francisco-Oakland-San Jose, Calif." The map 918 may display available inventory, which is also shown in the results spreadsheet 916. The locations on the map 918 correspond with the regions shown in the results spreadsheet 916. The map 918 may display available, unavailable, or an advertiser's already booked inventory for particular regions. An advertiser may click on the map 918 to select and purchase featured advertisements for a particular region for a given category 904 or sub-category 906. The map 918 can be resized and the advertiser can zoom in and zoom out when selecting a region. As shown in map 918, the advertiser has selected the "Santa Clara, Calif" region associated with number 8 in the results spreadsheet 916. The details 920 of that particular region are shown including the inventory available, the price, and the location of the featured listings available.

In FIG. 2, the invoice advertiser/reseller 216 may use a feed upload 222 for purchasing ads. A feed may be an XML or EXCEL file or a tab-delineated spreadsheet with information for the purchase of an ad. For an invoice advertiser/reseller 216, once a daily feed of featured listing candidates has been received, reviewed and processed, then the applicable featured listing requests may then be confirmed and booked with inventory management 230. The invoice advertiser/reseller 216 may pass category and region information flow to the feed upload 222. In one embodiment, the invoice advertiser/reseller 216 may use a trusted feed generator ("TFG") 220 to purchase the ads for the advertiser/reseller 216. The TFG may be a third-party company that handles an advertiser's purchase of bulk ads. The feed upload 222 communicates with the indexing and feed processing 224. The self-serve interface 212 may also communicate with the indexing and feed processing 224. The indexing and feed processing 224 may be used to provide advertisements to the search algorithmic engine 244 to be available for a user's search.

A user or consumer query 240 may be entered into a consumer interface 242. The consumer query 240 includes a search term to be searched and may include a location for the search, such that search results relate to the search term and entered location. Alternatively, a location may be determined implicitly or not used at all. The location may be used to limit the results for the search term to include relevant results located in the location selected by the user. In one embodiment the consumer interface 242 is an interface to a website that may be used to search over the Internet. The consumer interface 242 may supply the search parameters to the search algorithmic engine 244 to perform the search. The results from the search are displayed on the web page 202. The indexing & feed processing 224 may have enhanced listings that are added to the algorithmic results through the search algorithmic engine 244.

The ad server 232 receives the search terms for the search from the consumer interface 242 in order to display the appropriate advertisements in the web page 202. The ad server may check and confirm inventory from inventory management 230. The ad server 232 provides featured listings 204, 206 to the web page 202.

Figure 10:
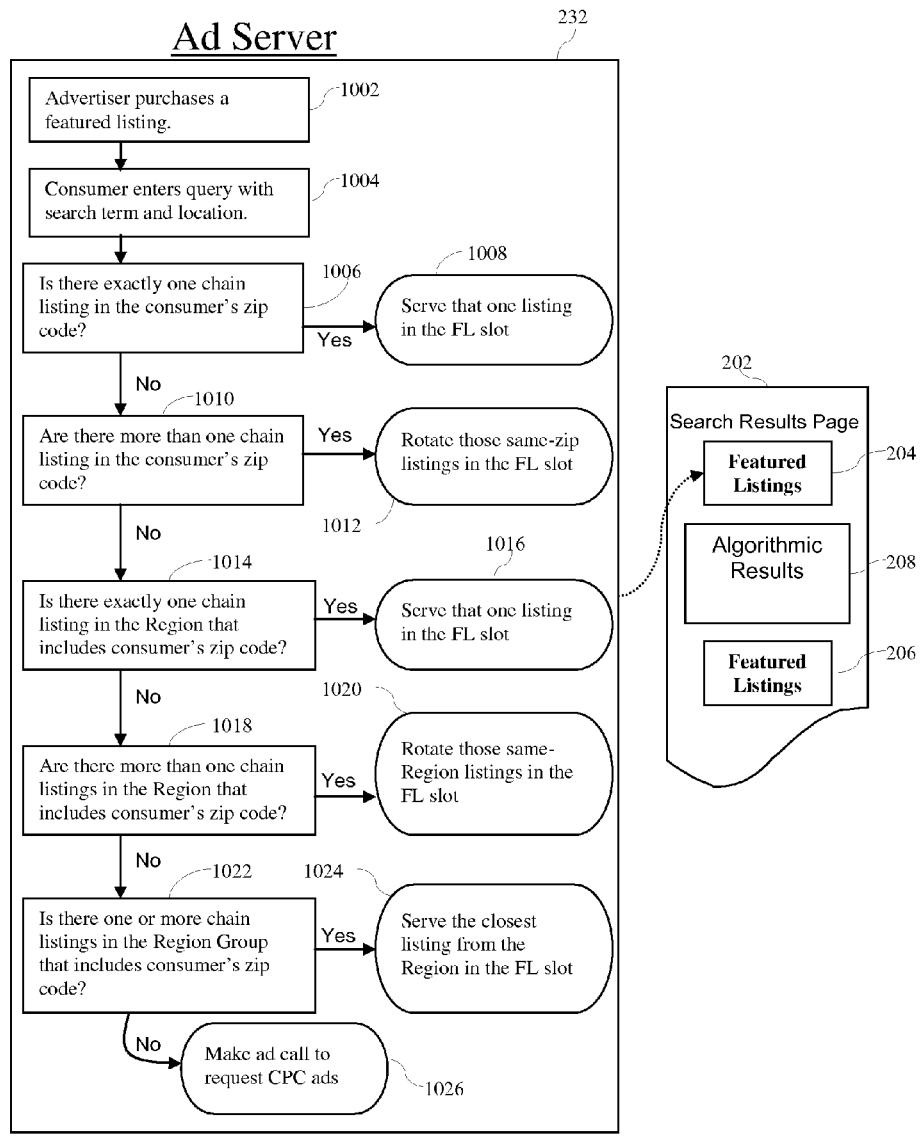
FIG. 10 is a flow chart illustrating an exemplary process flow of ad server.

FIG. 10 is a flow chart of a logic for an exemplary ad server 232. The ad server 232 may select which advertisements are shown and may display the relevant featured listings 204, 206 in the web page 202. In block 1002 the advertiser purchases a featured listing. The advertiser may purchase one slot for a featured listing based on a particular category in a particular geographic location. In block 1004, the consumer may enter a query with a search term and a geographic location. The geographic location can be set up in multiple ways. For example, the location may be broken down by neighborhoods, city blocks, zip codes, area codes, cities, counties, states, or any other mechanism.

Figure 11:
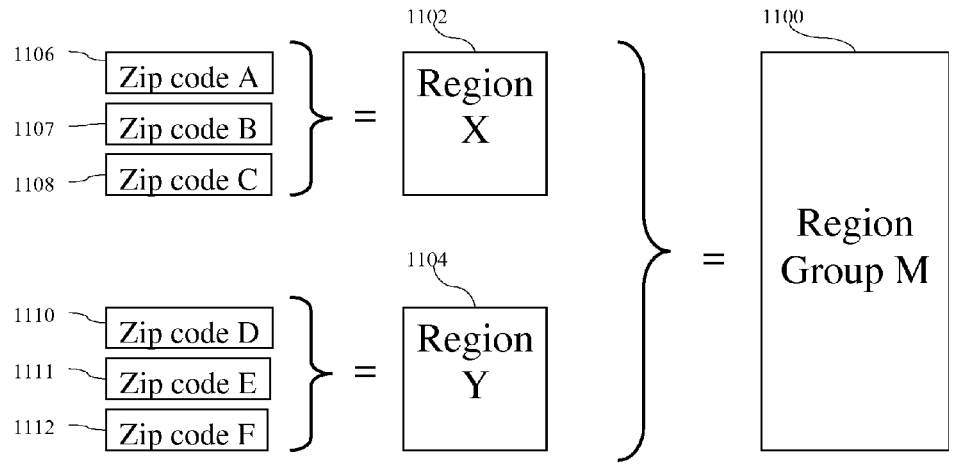
FIG. 11 is a block diagram illustrating an exemplary grouping of geographic regions.

FIG. 11 is an illustration of the possible breakdown of geographic regions according to one embodiment. The determination of geographic regions can be accomplished in many different ways and FIG. 11 is merely exemplary. FIG. 11 illustrates two regions 1102, 1104, which include various zip codes 1106-1108, 1110-1112. Region X 1102 includes zip codes A, B, C 1106-1108 and region Y 1104 comprises zip codes D, E, F 1110-1112. Further, regions 1102, 1104 are part of a region group 1100. Region group M 1100 includes regions 1102, 1104. In this example, zip codes are a subset of the regions, which are a subset of a region group. Zip codes, which may relate to postal zip codes are just one way to identify multiple geographic locations and the regions including multiple zip codes could correspond to counties or other areas. Region group M 1100 could be a state, parts of a state, or a group of states in this example.

Figure 12:
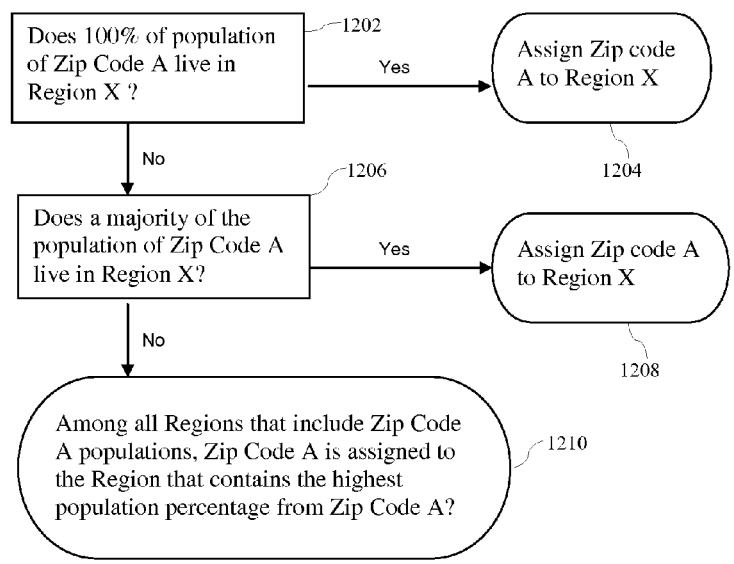
FIG. 12 is a flow chart illustrating an exemplary process flow for the assignment of geographic regions.

While FIG. 11 illustrates the hierarchy of regions, FIG. 12 is a flow chart illustrating an exemplary assignment of zip codes to particular geographic regions. In block 1202, if all the population of zip code A lives in region X then zip code A is assigned to region X according to block 1204. Likewise, if not all the population of zip code A lives in region X, then according to block 1206, if the majority of the population of zip code A lives in region X, then assign zip code A to region X according to block 1208. If a majority of the population of zip code A does not live in region X then according to block 1210, zip code A is assigned to the region which has the largest percentage of the zip code A's population. This illustrates an exemplary way in determining geographic locations by using regions made up of zip codes.

In FIG. 10, block 1006 involves determining the featured listings for the consumer's query for a particular zip code. Again, this example uses zip codes, which form regions, however, as discussed above, the geographical breakdown associated with listings can be done in many different ways with many options for determining regions and geographic locations. If there are not multiple featured listings for the same company within a zip code, then a featured listing slot may be filled with the only listing according to block 1008. If there are multiple featured listings for the same company within a zip code for a particular category according to block 1010, then to prevent the same listing from always being displayed or to prevent the featured listings from being filled with all of the same company, those multiple same-zip, featured listings may be rotated in the featured listing slot in block 1012. The featured listings may be rotated such that a different listing appears from the previous one that was listed when a new search is conducted. Alternatively or additionally, the listings may be rotated such that they appear and disappear on a single page over time in a sequential manner.

The embodiments described above discuss the use of geographic limitations such as regions or zip codes in a search engine to determine advertisements, and also to determine search results or non-featured listings. As discussed above, when a consumer searches within a particular region such as a zip code, the search engine first looks within that zip code for available advertisements. If there are no advertisements in the zip code, then the geographic area is expanded and the search engine looks for advertisements in the same region. If no advertisements are available in the region, then the search engine may expand further to a region group. This is one embodiment of dynamic expansion of geographic location. In an alternative embodiment, a search may have very few listings for a small neighborhood, so the geographic limits used by the search engine are automatically expanded to encompass a greater area. Likewise, the geographic area covered may be expanded in determining which advertisements are displayed. The applicable geographic area for advertisements may be systematically expanded in order to find an advertisement that matches the user's location. The ad-server displays the geographically relevant ads by starting from a close range (e.g. zip code) and then expanding outwards to a limited geographic area (e.g. region or region group) to display advertisements within those geographic limits.

Figure 13A:
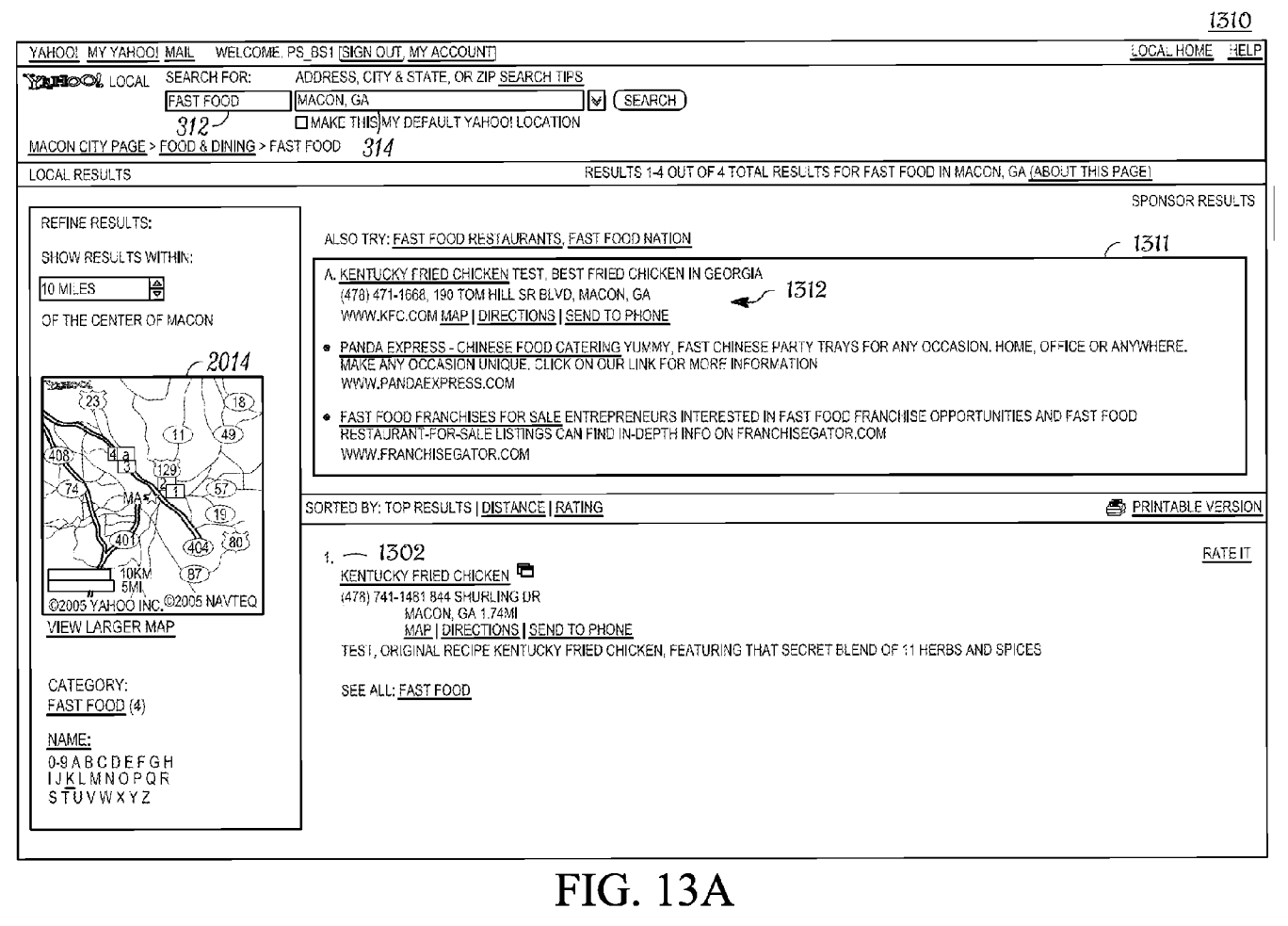
Figure 13B:
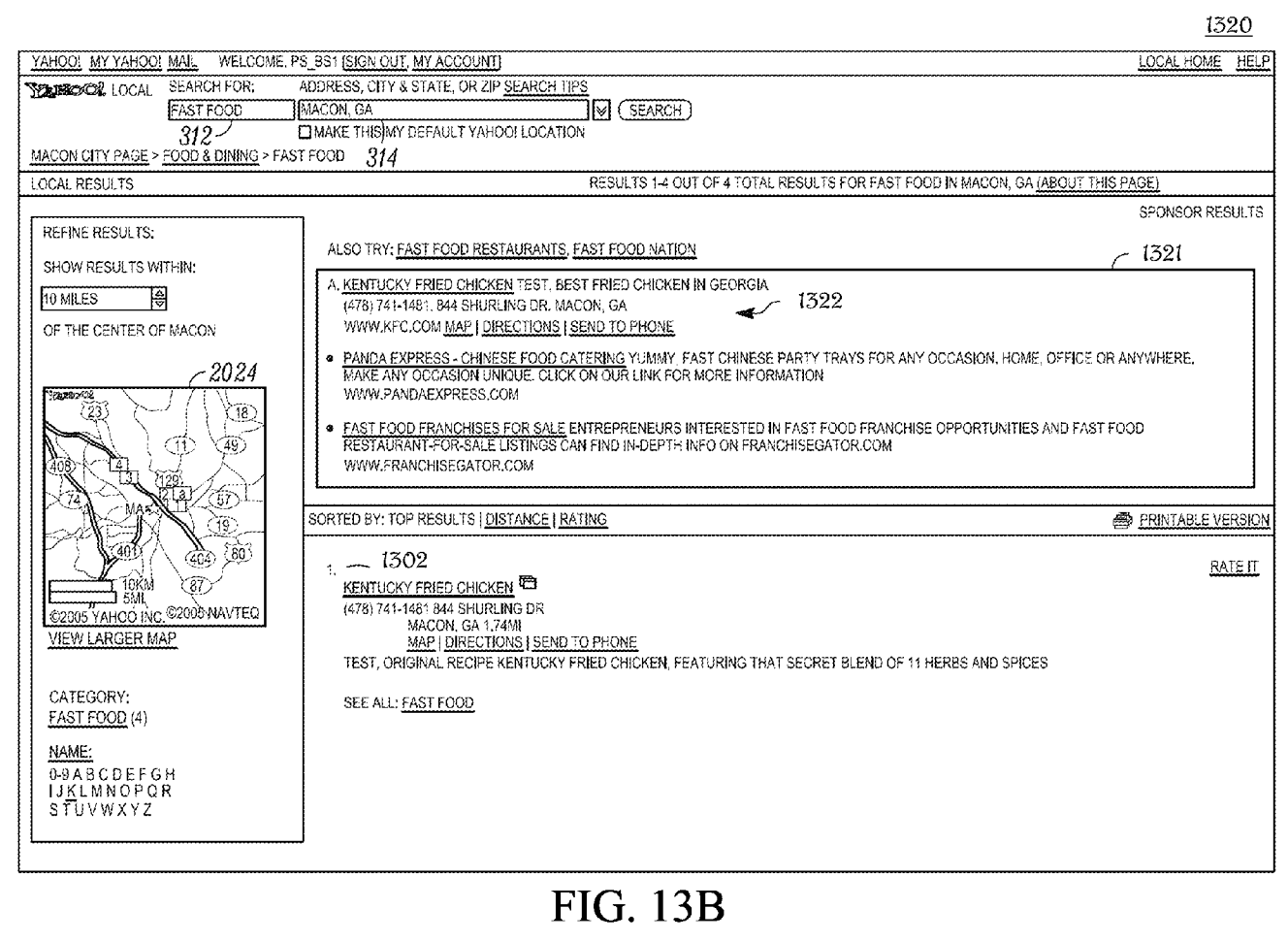

FIG. A and FIG. 13B are exemplary illustrations of two search results pages 1310, 1320 that are implementing a rotated featured listing. The web pages 1310, 1320 have a search box 312 and a location box 314 adapted to receive a user's input. The search term in search box 312 may be "fast food" and the geographic location in location box 314 may be "Macon, GA." The non-featured search result 1302 is the same for both web pages 1310, 1320 because the search term and location are the same for both searches. Search results page 1310 has a featured listing 1312, whereas web page 1320 has a featured listing 1322, which is a different location of the same company. Featured listings 1312 and 1322 are both KENTUCKY FRIED CHICKEN stores, however, they are different stores with different addresses. Rather than display two featured listings of KENTUCKY FRIED CHICKEN stores, the location of the particular KENTUCKY FRIED CHICKEN store shown may be rotated or alternated.

This example shows that the search result is independent of the featured listings 1311, 1321 or advertisements. In one embodiment, regardless of which advertisements are shown on a web page, the search results are based on an algorithm within a search engine. In web page 1320, the search result 1302 correlates to the featured listing 1321. As discussed below, the advertiser category which determines the featured listings that are shown may be influenced by the search results, but the search results may not be influenced by the advertisements. The search results may be enhanced, but the list does not change, merely the appearance for an enhanced listing changes.

In the example from FIG. 13A and FIG. 13B, web pages 1310, 1320 contain three featured listing slots 1311, 1321. This is an example where the advertising slots are limited because there are only three ads shown. The rotation of featured listings may ensure the consumer/searcher/user will have variety in the advertisements that are displayed when there is limited advertisement space available. Advertising may be less effective and less user friendly if all three featured listings are filled with the same company at three different locations. It also may give the perception that the search may be biased when there are three advertisements for the same company. Rotation of ads may eliminate this overlap and ensure each company can only have one featured listing displayed at a time. The rotation may be perceived as being fair because the individual store locations both receive advertisement time. Rotation of the advertisements may enable the advertiser to share the benefits of the advertising opportunity with both of its locations, by displaying each location's listings to a portion of the users making the query within the geographic location.

In an alternative embodiment, if an exact geographic location of the user is known, such as a street address, then the featured listing that is shown may be the closest location to the user. In the KENTUCKY FRIED CHICKEN example, the store with the closest address to the user may be shown. However, if the exact address or geographic location is not known, such as a search within a zip code when there are multiple KENTUCKY FRIED CHICKEN store's in the zip code, then the featured listings may rotate the stores in that zip code that are shown as a featured listing.

An advertiser has the option of selecting the geographic location in which they display featured listings. A national chain advertiser may choose to purchase ads for geographic locations across the U.S. despite not having stores in every region, or any other geographical boundary (zip code, state, county, etc.). Examples of such advertisers include a hardware chain or a furniture chain. If a user performs a search in a category covered by the furniture chain, but not in a region where the store is located, a featured listing may be shown for the closest store from the furniture chain despite the fact the store is not located within the designated geographical boundary.

In yet another example, the featured advertisement shown may be rotated, however, the ad may contain a link so that the user can view multiple locations of the business. In the example from FIG. 13A and FIG. 13B, only one KENTUCKY FRIED CHICKEN location is shown as a featured listing, but regardless of which location is shown, the featured ad may include a link that enables the user to view all the locations of KENTUCKY FRIED CHICKEN in the particular geographic location. If the user engages the link, a separate web page or other display area such as a pop-up window may display other locations of KENTUCKY FRIED CHICKEN. Alternatively, the other locations can display on the map 1314, 1324 when the user clicks the link or moves the cursor over the link.

The rotation may be accomplished for companies that are advertising more than one brand. For example, GAP, OLD NAVY and BANANA REPUBLIC are all part of the same holding company. However, to consumers, the three brands are three different entities. Therefore, the holding company may purchase multiple advertisements for the three brands in the same category and location. If there are three featured listings slots open, then they may be each filled with one ad for GAP, OLD NAVY and BANANA REPUBLIC. This example illustrates that the advertiser purchasing an ad can have many different forms, and consequently, the ad listings shown and whether there is a rotation may be dependent on the relevant facts. In this case, the holding company is the advertiser, but there may not be rotation because the advertisements are for three different brands. Therefore, rotation may not be based on the company that is the advertiser, but may be based on the brand that is being advertised.

The rotation described above is not just for featured listings. Alternatively, there may be rotation of any advertisements on a page regardless of their location. Further, the search results or non-featured listings may also be rotated in an alternative embodiment.

Referring to FIG. 10, in block 1014, if there is exactly one chain listing in a particular region then that listing may be used for a featured listing slot in block 1016. In block 1018, if there are multiple listings for a given company or chain in a region that includes the consumer's zip code, then those listings may be rotated in the featured listing slot in block 1020. This rotation may be similar to the rotation in FIG. 13A and FIG. 13B; however, the featured ads that are rotated may be located in the same region rather than the same zip code. FIG. 13A and FIG. 13B are examples of rotation for locations within the same region rather than within the same zip code. Alternatively, the featured ads may be rotated when multiple locations are in the same zip code rather than the same region.

Likewise, in block 1022, if there are multiple chain listings in a region group that include the consumer zip code, the closest listing to the consumer's zip code may be filled in the featured listing slot in block 1024. However, if there is not a listing in the region group that includes the consumer's zip code then the featured listing slots may be filled with other sponsored ads, such as back-fill cost-per-click (CPC) ads according to block 1026. A CPC advertisement may be an ad in which an advertiser bids to have a listing. The ad may be displayed on the page 202, 1310, 1320 in accordance with the bid amount, such as the highest bids being displayed on the top portion of the page. The advertiser may pay the bid amount each time a user clicks on a link of the advertisement.

In FIG. 2, the ad server 232 may provide a back-fill with CPC 234 to fill in the featured listings 204, 206. In one embodiment, there may be six featured listings slots and if there are not six purchased featured listing advertisements that meet the search category and geographic location of a consumer query 240, then the remaining featured listing slots may be filled with other advertisements, which may be referred to as back-fill. In one embodiment, the featured listings are ordinarily purchased on a monthly rate; however, the back-fill could include CPC or any other advertisements. The back-fill may be filled by other advertisements, or even additional search results or non-featured results.

The consumer query 240 allows a user/consumer to enter a search term. The search algorithmic engine 244 is coupled with the category engine 246, which is coupled with the ad server 232. The category engine 246 determines the category of the consumer's search query or search term. The category of the consumer's search query is associated with an advertiser category. The search category is the category associated with the consumer's search. There may be a database of potential advertiser categories and the search category is matched to or compared with an advertiser category.

The search category may be used to determine which advertisements are displayed as discussed above. In the examples from FIG. 3, the category was "golf courses." The featured listings may be purchased based on geographic location and based on a search category. At the time of purchase, an advertiser may select a search category to be associated with their featured listing. The determination of geographic location may be determined as discussed above, while the determination of the search category may be performed by the category engine 246.

In one embodiment, a consumer enters a search term for a given geographic location and that search term is compared or matched with an existing database of available categories that may correlate to the search term. The matching of the search term could be accomplished in a variety of different ways. A search through the advertising category database with the search term may result in many possible advertiser categories. Alternatively, if the search term is an actual advertiser category, then the search may be associated with or correlated to that category. For example, the category for the search term "golf courses" may be "golf courses," "golf," or "courses." The database of available categories may be created and maintained by the search engine and can be updated based on new categories for new listings. The listings that result from the search may be assigned categories based on the categories listed in the database. The categories can be associated with keywords from a search and/or search results or listings.

In an alternative embodiment, the search category may be determined based on a database of advertiser categories that are associated with search keywords. Any search term used by the consumer may be associated with a category in the database. However, this technique of determining categories may be limited by the keywords in the database. A search keyword that is not in the database may have to be associated with a search category in a different way than from the database.

Figure 14:
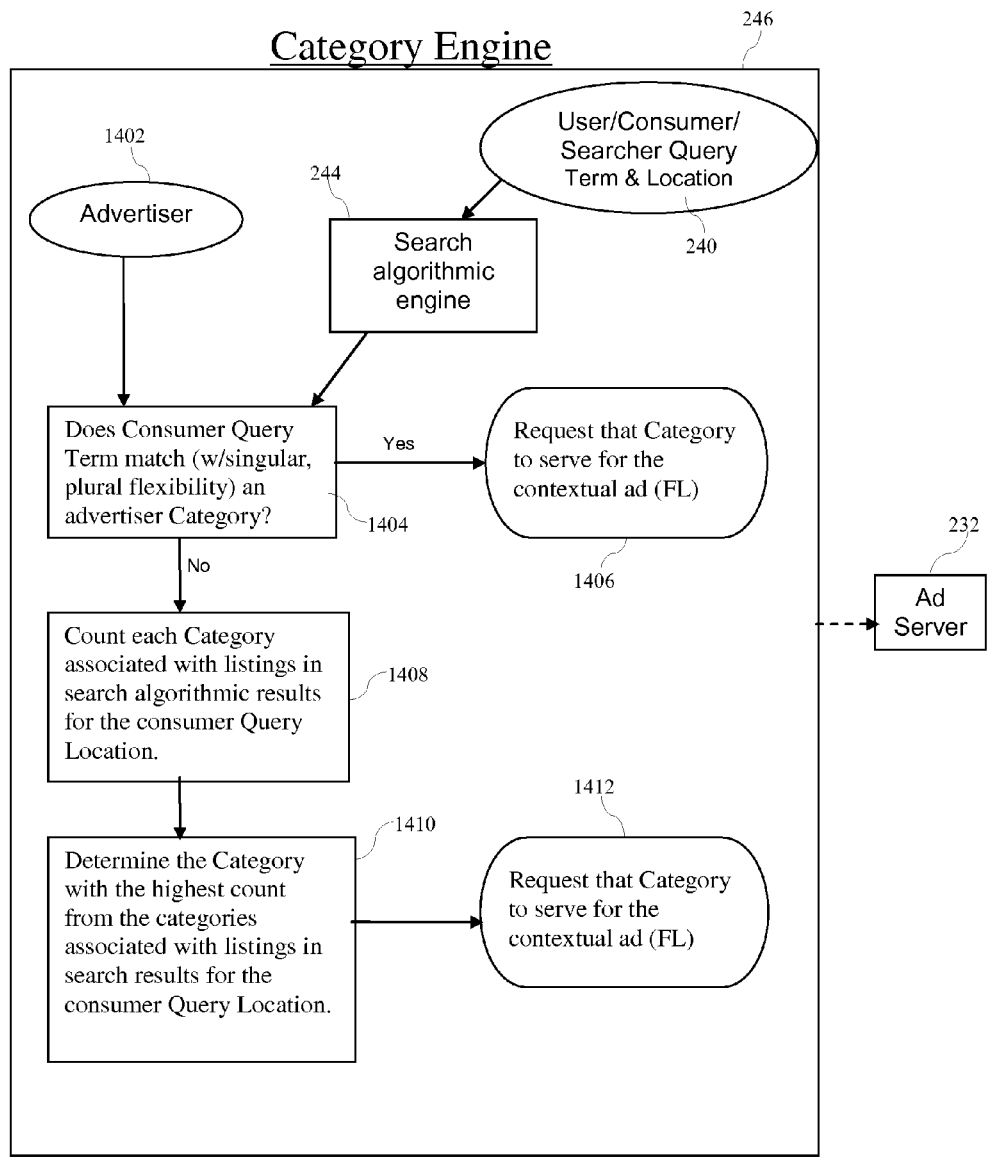
FIG. 14 is a flow chart illustrating an exemplary logic for determining a category for an advertisement.

FIG. 14 is a flow chart illustrating the logic of an exemplary category determination by the category engine 246. An advertiser 1402 may purchase a featured listing based on a particular category and geographic location. The consumer enters a query 240 comprising a search term and/or a location into the search algorithmic engine 244. In block 1404, the category engine 246 determines if the search term from the consumer matches or correlates to an established advertiser category. The advertiser categories may be located in an existing database. The existing database may be associated with the search algorithmic engine 244 and may be updated from time to time. If the search term matches or correlates to an advertiser category, then the advertiser category may be established as the search category in block 1406. The matching may take into account variations of categories, such as spelling errors, capitalization, spacing, singular/plural, or other forms of words. If the search term does not match or correlate with an advertiser category in block 1404, then a search category is determined according to blocks 1408 and 1410. In block 1408, each of the algorithmic search results are associated with at least one advertiser category. In block 1410, the advertiser category that is associated with the most algorithmic search results is the search category in block 1412.

According to the exemplary embodiment, the search results may each be associated with one or more advertiser categories. This association may be used to determine the search category. Since each search result may be associated with at least one advertiser category, an advertiser category may be associated with one or more search results. The number of times a search result is associated with a particular advertiser category may be referred to as that category's count or amount. Each advertiser category's count is the sum total of the number of search results associated with that category. The advertiser category with the highest count may then be determined as the search category according to blocks 1410-1412.

Alternatively, search result listings may have consumer notes or "Tags" associated with them. Tags can be referred to as any information that is or becomes associated with a search or particularly search results. Generally, the Tag is either consumer created or consumer modified. These Tags and any associate Tag descriptions or other content can be integrated with the search engine and may contribute toward determining the search category count of a set of search listings resulting from a consumer search. Tags can also be viewed as a separate category hierarchy (based on Tags clustered into a single category concept) used in the same way to determine the category for contextual advertising. Using Tags as the input for categories has the potential benefit of having the consumer community review and maintain the quality of the Tag/category association for each listing.

Tags may be a more open or interactive hierarchy as compared with traditional categories which are more of an authoritative set. Tags may include many different user inputted terms that cluster around a certain concept. For example, a golf club store may be named "Follow Through Equipment." At first, this business may only sells golf club and when providing their listing information for algorithmic search results, they only select the category "Golf equipment." After some time passes, this store may expand to sell things like tennis racquets and baseball bats. The business owner may not remember to add additional categories to his listing. However, consumers who shopped at this store may see the listing online and add Tags to the listing for terms that cluster around the concept "tennis equipment" and "baseball equipment." With enough consumer indicated tags, these additional categories may be associated with this listing. Similarly, if the business stops selling baseball bats, the consumer tags may be updated to reflect the change.

The category determination may depend on or be independent of the geographical location. The category may be determined based on the search results. If the search results are for a certain geographic location, then the search results will be within that geographical location. Accordingly, identical searches may be associated with different categories depending on geographic location. For example, a search for the term "plants" may result in the category "Nurseries & Greenhouses" in one geographic location, but may result in the category "Wholesale Flowers" in a different geographic location because the search results for those locations may be different.

Referring to FIG. 2, as a broad overview, an advertiser 210, 216 purchases an ad based on a search category and geographic location or region. A consumer 240 uses a search engine 244 to obtain search results for a selected search term or search terms. The category engine 246 determines the advertiser category that is matched with the search term or search terms and the ad server 232 places the ads on the web page 202.

The media used to transmit information across communication links as described above illustrate one type of machine-readable media, namely communication media. Generally, machine-readable media include any media that can be accessed by a computing device or other electronic device. Machine-readable media may include processor-readable media, data storage media, network communication media, and the like. Communication media typically embody information that includes processor-readable instructions, data structures, program components, or other data in a modulated data signal such as a carrier wave or other transport mechanism. Such media may include any information delivery media. The terms "modulated data signal" and "carrier wave signal" include a signal that has one or more of its characteristics set or changed in such a manner as to encode information, instructions, data, and the like in the signal. By way of example, communication media include wired media such as twisted pair, coaxial cable, fiber optic cable, and other wired media, and wireless media such as acoustic, RF, infrared, and other wireless media.

Figure 15:
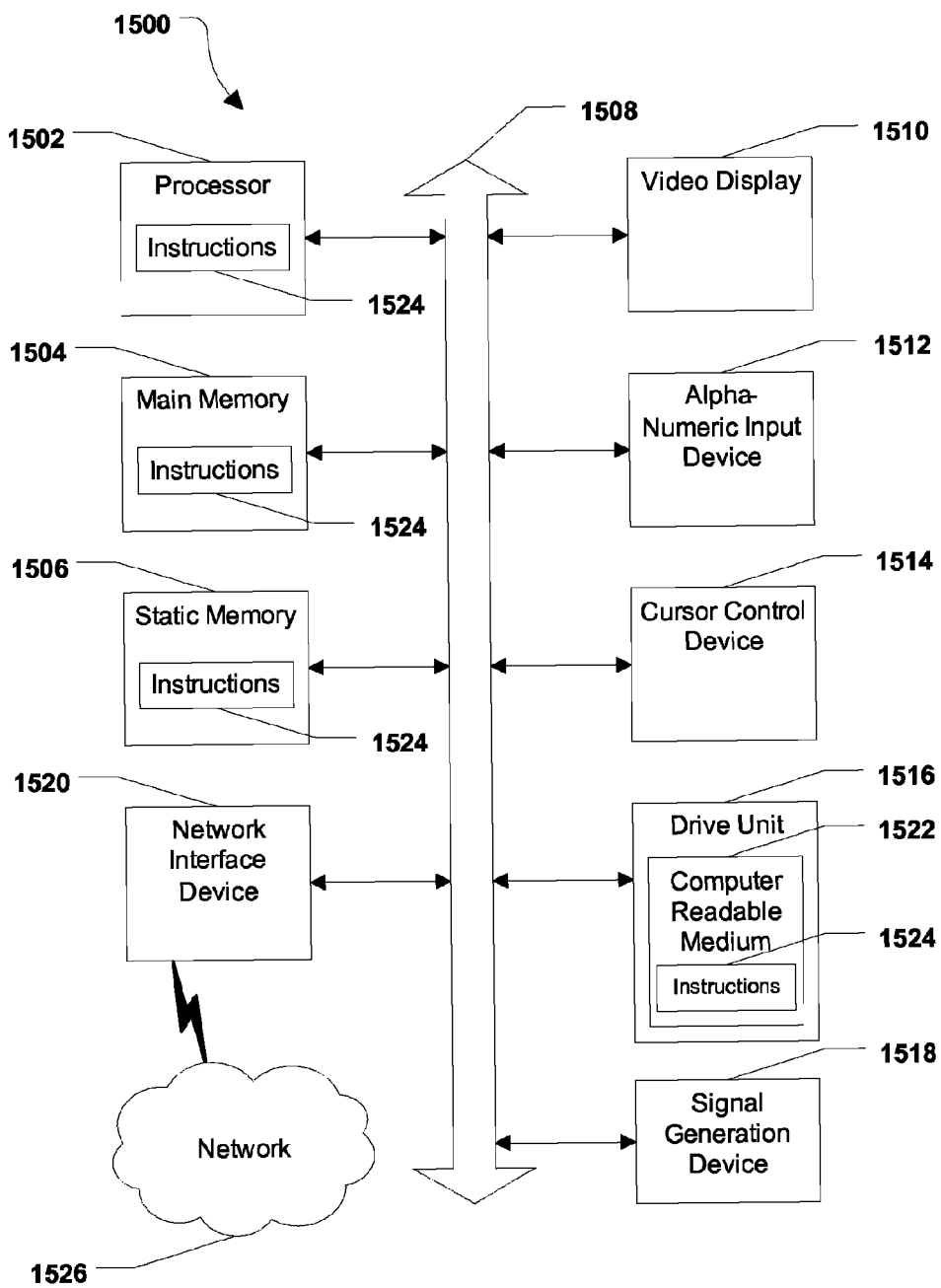
FIG. 15 is a block diagram of an exemplary general computer system.

FIG. 15 is an illustrative embodiment of a general computer system 1500. The computer system 1500 can include a set of instructions that can be executed to cause the computer system 1500 to perform any one or more of the computer based functions disclosed herein. The computer system 1500 may operate as a standalone device or may be connected, e.g., using a network, to other computer systems or peripheral devices. Suitable operating systems include any of the MICROSOFT WINDOWS suite including XP, NT and DOS. Other operating systems may be used such as UNIX or LINUX, and the program may be invoked from another program such as an Application Program Interface (API). Furthermore, alternative software implementations may be used including, but not limited to, distributed processing or component/object distributed processing, parallel processing, or virtual machine processing can also be constructed to implement the tools described herein.

In a networked deployment, the computer system may operate in the capacity of a server or as a client user computer in a server-client user network environment, or as a peer computer system in a peer-to-peer (or distributed) network environment. The computer system 1500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a television, a network router, switch or bridge, or any other machine capable of executing a set of instructions (sequential or otherwise) that specify actions to be taken by that machine. In a particular embodiment, the computer system 1500 can be implemented using electronic devices that provide voice, video or data communication. Further, while a single computer system 1500 is illustrated, the term "system" shall also be taken to include any collection of systems or sub-systems that individually or jointly execute a set, or multiple sets, of instructions to perform one or more computer functions.

On an interconnected set of local area networks (LAN), including networks employing differing protocols, a router may act as a link between LANs, enabling messages to be sent from one to another. Communication links within LANs typically include twisted wire pair or coaxial cable. Communication links between networks may generally use analog telephone lines, full or fractional dedicated digital lines including T1, T2, T3, and T4, Integrated Services Digital Networks (ISDNs), Digital Subscriber Lines (DSLs), wireless links including satellite links, or other communication links. Remote computers and other network-enabled electronic devices may be remotely connected to LANs or WANs by way of a modem and temporary telephone link.

In FIG. 15, the computer system 1500 may include a processor 1502, e.g., a central processing unit (CPU), a graphics processing unit (GPU), or both. Moreover, the computer system 1500 can include a main memory 1504 and a static memory 1506 that can communicate with each other via a bus 1508. The computer system 1500 may further include a video display unit 1510, such as a liquid crystal display (LCD), an organic light emitting diode (OLED), a flat panel display, a solid state display, or a cathode ray tube (CRT). Additionally, the computer system 1500 may include an input device 1512, such as a keyboard, and a cursor control device 1514, such as a mouse. The computer system 1500 can also include a disk drive unit 1516, a signal generation device 1518, such as a speaker or remote control, and a network interface device 1520.

In FIG. 15, the disk drive unit 1516 may include a computer-readable medium 1522 in which one or more sets of instructions 1524, e.g. software, can be embedded. Further, the instructions 1524 may embody one or more of the methods or logic as described herein. The instructions 1524 may reside completely, or at least partially, within the main memory 1504, the static memory 1506, and/or within the processor 1502 during execution by the computer system 1500. The main memory 1504 and the processor 1502 also may include computer-readable media.

Dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

A computer-readable medium is contemplated that includes instructions 1524 or receives and executes instructions 1524 responsive to a propagated signal, so that a device connected to a network 1526 can communicate voice, video or data over the network 1526. Further, the instructions 1524 may be transmitted or received over the network 1526 via the network interface device 1520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

The computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. An ad server comprising a processor and processor-readable media for providing advertising content for display in a page over a computer network to a user, comprising:
   a database to store a plurality of advertisements; and
   a computer executed program, including:
      a first routine to determine a qualified advertisement from the plurality of advertisements for display in a portion of the page, wherein the qualified advertisement is for a single advertiser's business at a location in a geographic area, wherein the single advertiser has a plurality of business locations, and wherein the single advertiser has a different version of an advertisement corresponding to each of the plurality of business locations;
      a second routine to determine when the single advertiser has a plurality of different qualified advertisements, each of the single advertiser's different qualified advertisements corresponding to a different business location located within the same geographic area; and
      a third routine, based on the second routine determination, to rotate the different qualified advertisements when the single advertiser has a plurality of qualified advertisements and each of the single advertiser's qualified advertisements is for a different business location in the geographic area, such that only one qualified advertisement corresponding to one of the single advertiser's business locations is displayed for each display of the page,
   wherein the one qualified advertisement comprises a hyperlink configured to initiate a fourth routine to display a plurality of the single advertiser's business locations on a map of the geographic area.

2. The ad server of claim 1, wherein the plurality of business locations is comprised of entities having different names, or entities having the same name and different store locations.

3. The ad server of claim 1, wherein an advertisement is qualified if the advertisement correlates to a geographic location of the user.

4. The ad server of claim 1, wherein more than one advertisement is displayed in the established portion of the page.

5. A method for displaying advertisements on a page, the method comprising:
   receiving a search query;
   determining a plurality of advertisements that are qualified for display on the page, wherein the qualified advertisements are related to the search query;
   determining whether more than one of the qualified advertisements are for a single advertiser having a plurality of business locations in a geographic region, wherein the qualified advertisements correspond to different business locations in the geographic region;
   displaying only one of the qualified advertisements from the single advertiser at a particular location on the page including results from the search query when the single advertiser has more than one of the qualified advertisements; and
   displaying, in response to a second receipt of the search query, a different one of the qualified advertisements from the single advertiser when the single advertiser has more than one of the qualified advertisements, wherein the displaying of a different one of the qualified advertisements from the single advertiser comprises rotating the more than one of the qualified advertisements, such that only a first advertisement from the single advertiser is displayed at the particular location on the page including results from search query, and only a second advertisement from the single advertiser is displayed at that particular location on the page provided in response to the second receipt, the second advertisement being different than the first advertisement;
   wherein the displayed qualified advertisements each comprise a link configured to initiate the display of a plurality of the single advertiser's business locations on a map when the user interacts with the link.

6. The method of claim 5, wherein the displayed advertisement for the single advertiser is for a business location that is located at one of a geographic location that correlates to a physical location of a user; or a geographic location that correlates to a location input by the user.

7. The method of claim 5, wherein single advertiser's more than one of the qualified advertisements comprises advertisements for entities having different names, or entities having the same name and different store locations.

8. The method of claim 5, wherein the single advertiser comprises an advertiser that has businesses established at different locations.

9. The method of claim 5, wherein the advertiser comprises businesses having more than one brand.

10. A method for providing advertising content for display in a page over a network to a user, the method comprising:
providing an input selector for an advertiser to input a search category for each of the advertiser's advertisements, wherein the search category corresponds to a possible query term of the user;
providing an input selector for a single advertiser to input an advertisement region for each of the advertiser's advertisements, wherein the advertisement region corresponds to a possible location of the user, wherein the single advertiser has a plurality of business locations in the advertisement region and a different advertisement for each of the business locations in the advertisement region;
receiving a user query term inputted by the user;
identifying a user region comprising a user location; and
determining when the single advertiser's advertisements comprise two or more qualified advertisements each comprising different versions of an advertisement specific to a different business location of the single advertiser located within the user region, wherein the qualified advertisements have a search category that corresponds to the user query term and an advertisement region that corresponds to the user region; and
displaying, based on the determination, only one of the qualified advertisements from the single advertiser's advertisements during each display of the page, wherein the displaying comprises rotating the two or more qualified advertisements, such that only a first qualified advertisement from the single advertiser is displayed during a first display of the page, and only a second qualified advertisement from the single advertiser is displayed during a second display of the page,
wherein the displayed first or second qualified advertisement comprises a link configured to initiate the display of a plurality of the single advertiser's business locations on a map when the user interacts with the link.

11. The method of claim 10, wherein the user location comprises a physical location of the user at the time a search is conducted by the user.

12. The method of claim 10, wherein the input selector comprises a dropdown menu.

13. The method of claim 10, wherein the input selector comprises a map.

14. The method of claim 10, wherein the user location is determined based on a feed from the user.

15. A method for providing advertising content for display in a page over a computer network, the method comprising:
receiving a search query, the search query associated with a geographic area;
identifying a set of qualified advertisements for businesses located within the geographic area;
selecting, upon receipt of the search query, an advertiser that has more than one qualified advertisements for a plurality of businesses located with the geographic area associated with the search query, wherein each of qualified advertisement is specific to at least one of the advertiser's business locations in the geographic area; and
displaying only one of the qualified advertisements for the advertiser in response to the search query, wherein the displaying only one of the qualified advertisements for the advertiser comprises rotating the more than one qualified advertisements for the plurality of business locations such that a different qualified advertisement for the advertiser is displayed in response to a second receipt of the search query,
wherein the displayed only one of the qualified advertisements comprises a link configured to initiate the display of a plurality of the single advertiser's business locations on a map.

16. The method of claim 15 wherein the advertiser comprises a business having locations at more than one geographic site.

17. The method of claim 15, wherein the geographic area comprises a geographic location of a user and is determined by an input from a user, a physical location of a user at a time of determining the qualified advertisement, a computer profile of a user, or information from a computer that performed the search query.

* * * * *